(12) United States Patent
Ikeda

(10) Patent No.: US 10,264,171 B2
(45) Date of Patent: Apr. 16, 2019

(54) IMAGE CAPTURE APPARATUS, LENS UNIT, DRIVER DEVICE, ELECTRONIC DEVICE, AND CAPTURING SYSTEM INCLUDING THE SAME

(71) Applicant: CANON KABUSHIKI KAISHA, Tokyo (JP)

(72) Inventor: Kaori Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 15 days.

(21) Appl. No.: 15/386,150

(22) Filed: Dec. 21, 2016

(65) Prior Publication Data

US 2017/0187945 A1    Jun. 29, 2017

(30) Foreign Application Priority Data

Dec. 25, 2015    (JP) .................................. 2015-254865

(51) Int. Cl.
| | |
|---|---|
| *G02B 7/08* | (2006.01) |
| *G02B 7/10* | (2006.01) |
| *H04N 5/225* | (2006.01) |
| *H04N 5/232* | (2006.01) |
| *H04N 5/235* | (2006.01) |

(52) U.S. Cl.
CPC .......... *H04N 5/23203* (2013.01); *G02B 7/08* (2013.01); *H04N 5/23209* (2013.01); *H04N 5/23212* (2013.01); *H04N 5/23219* (2013.01); *H04N 5/23245* (2013.01); *H04N 5/23296* (2013.01); *G02B 7/102* (2013.01); *H04N 5/2256* (2013.01); *H04N 5/2353* (2013.01); *H04N 5/23293* (2013.01)

(58) Field of Classification Search
CPC ................ G06T 7/004; H04N 5/23229; H04N 5/23254; H04N 5/23261; H04N 5/23267; H04N 5/23296
See application file for complete search history.

(56) References Cited

U.S. PATENT DOCUMENTS

| | | | | |
|---|---|---|---|---|
| 9,906,730 B2* | 2/2018 | Hashiguchi | .......... | H04N 5/2259 |
| 2005/0225661 A1* | 10/2005 | Yoshikawa | ............ | G02B 7/102 |
| | | | | 348/360 |
| 2008/0317295 A1* | 12/2008 | Koutaki | ............. | H04N 1/32112 |
| | | | | 382/118 |
| 2012/0307079 A1* | 12/2012 | Yumiki | ............... | H04N 5/23203 |
| | | | | 348/207.1 |

(Continued)

FOREIGN PATENT DOCUMENTS

JP         2014-027338 A        2/2014

*Primary Examiner* — Amy R Hsu

(74) *Attorney, Agent, or Firm* — Carter, DeLuca & Farrell LLP

(57) ABSTRACT

An interchangeable-lens image capture apparatus receives, from an external device, a command to control a zoom adapter for mechanically driving a zoom mechanism in an interchangeable lens from outside the interchangeable lens. The image capture apparatus then transmits the received command to the zoom adapter through the interchangeable lens. A zoom operation can be remotely performed from the external device on a manual zoom lens attached to the interchangeable-lens image capture apparatus, which has a function of communicating with the external device.

22 Claims, 23 Drawing Sheets

(56) References Cited

U.S. PATENT DOCUMENTS

2014/0354780 A1* 12/2014 Matsuura ............... G03B 35/08
            348/47
2014/0362451 A1* 12/2014 Sasaki .................... G03B 35/08
            359/672

\* cited by examiner

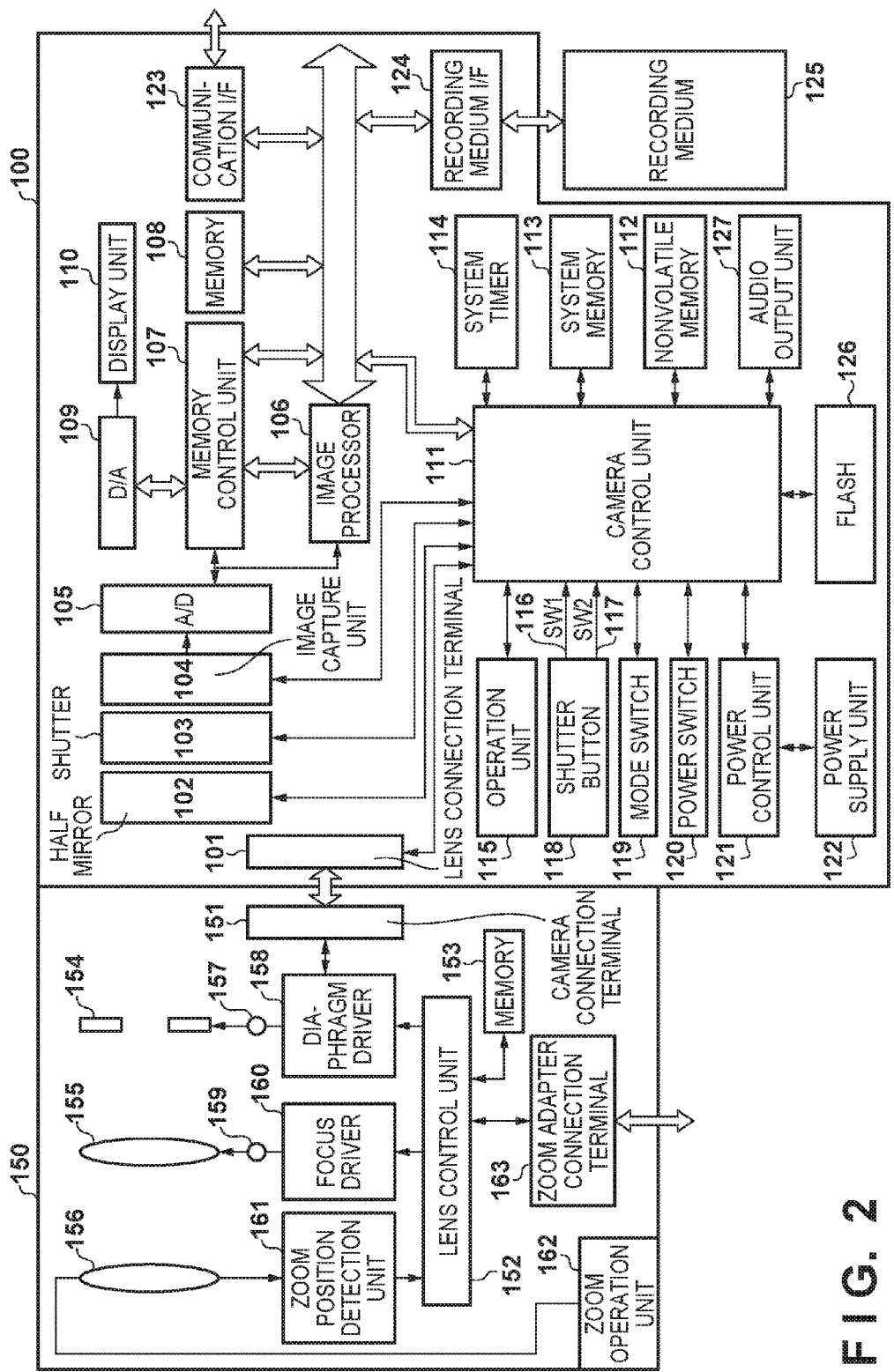
F I G. 2

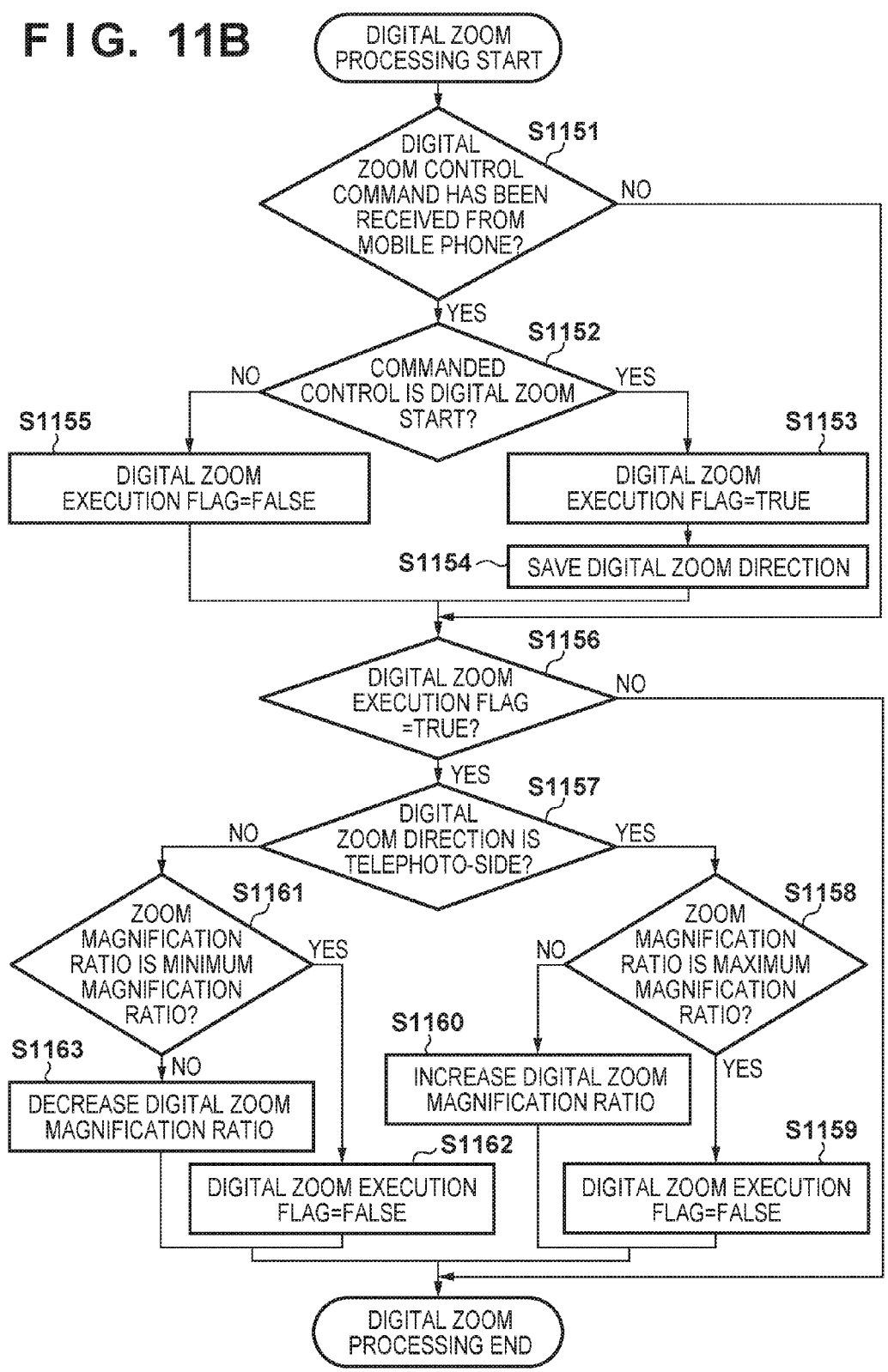

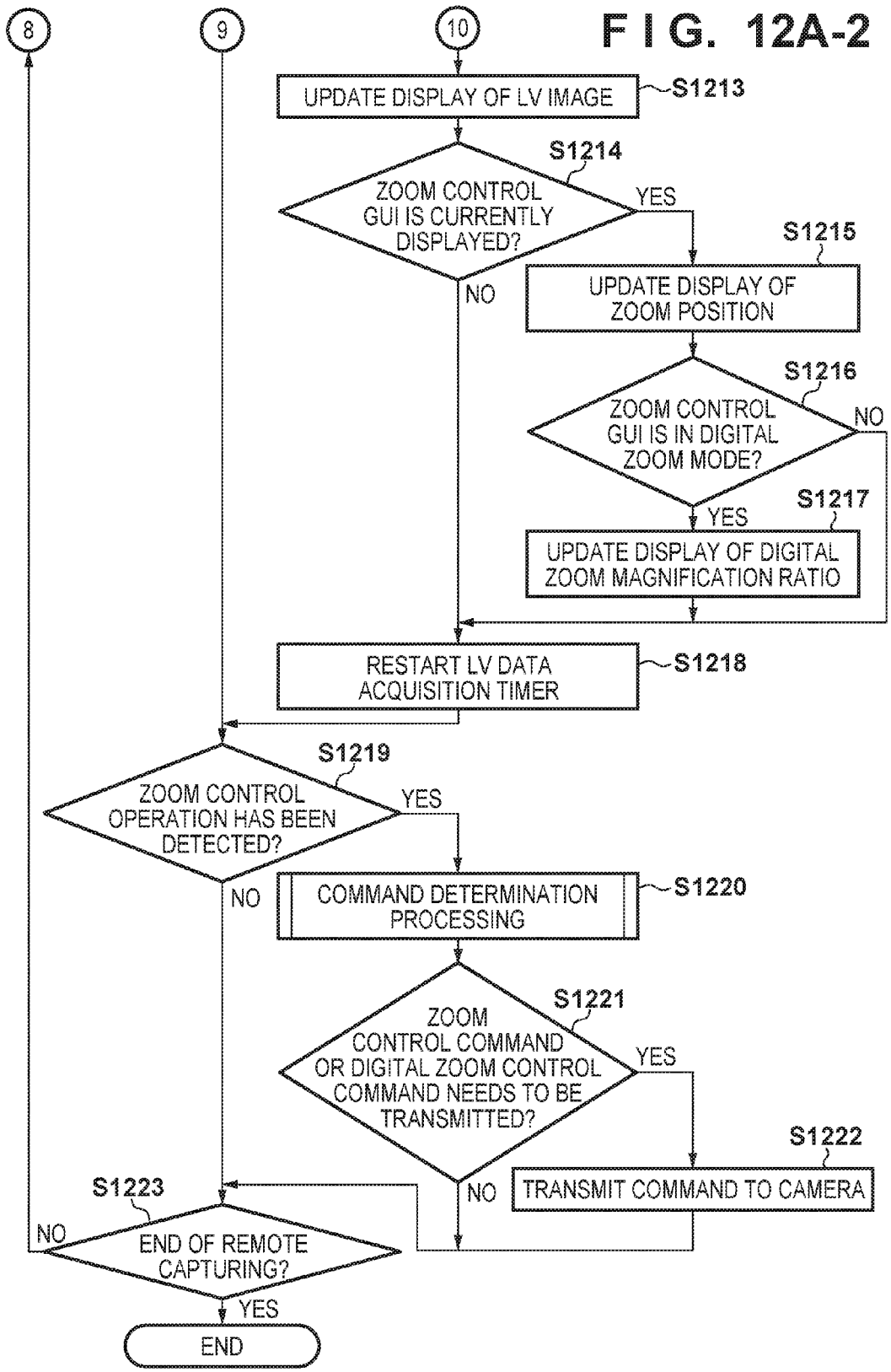

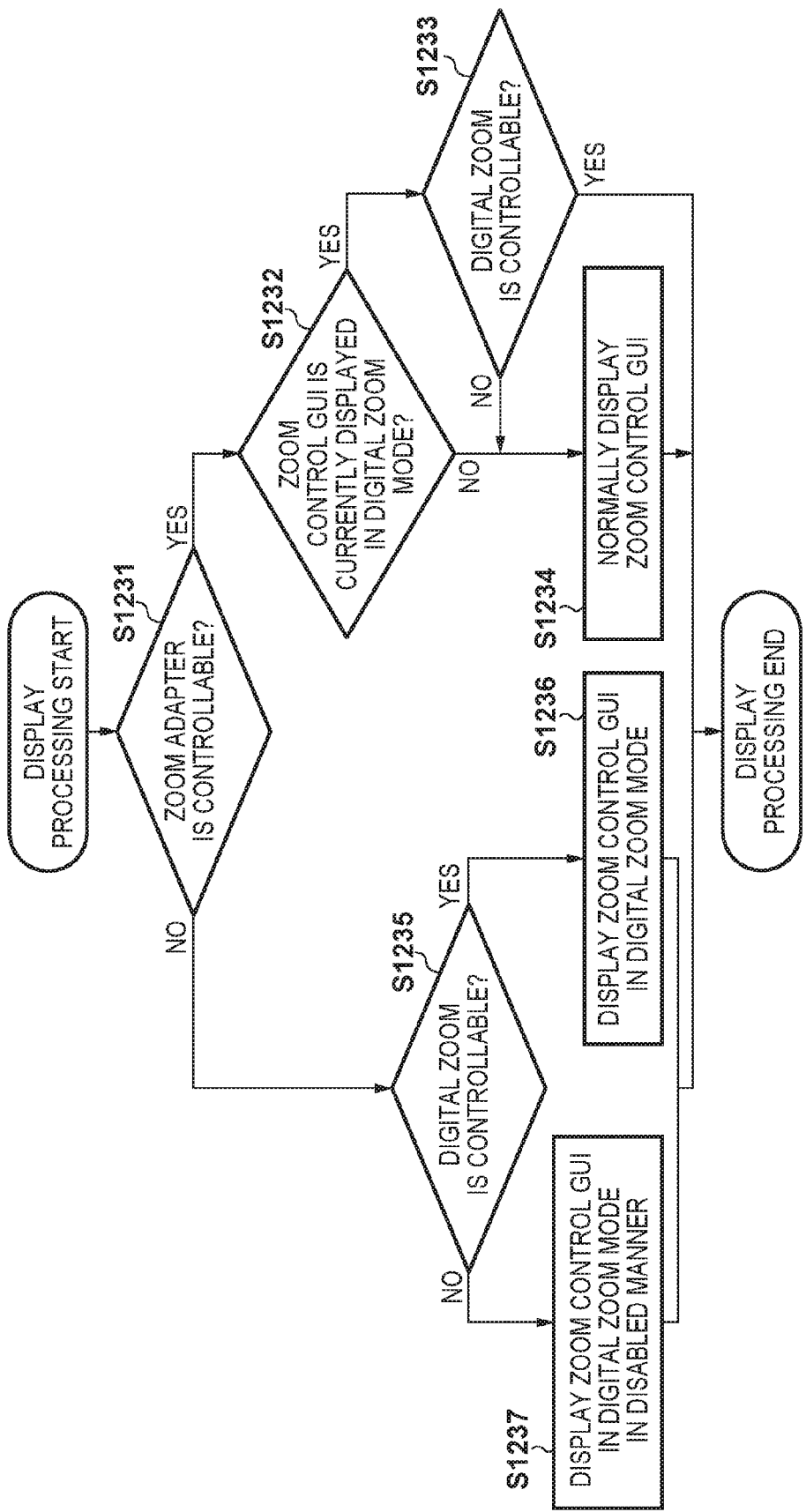

IMAGE CAPTURE APPARATUS, LENS UNIT, DRIVER DEVICE, ELECTRONIC DEVICE, AND CAPTURING SYSTEM INCLUDING THE SAME

BACKGROUND OF THE INVENTION

Field of the Invention

The present invention relates to an image capture apparatus, a lens unit, a driver device, an electronic device, and a capturing system including them.

Description of the Related Art

A system capable of causing an external device to display a live view image of a digital camera through wireless communication and performing remote capturing using the digital camera from the external device is known (Japanese Patent Laid-Open No. 2014-27338). A system capable of remotely performing a zoom operation on a digital camera from an external apparatus when the digital camera is provided with a non-interchangeable zoom lens is also known.

Meanwhile, in the case of an interchangeable-lens digital camera, a configuration in which a switch or a ring provided on a lens is operated to change the angle of view is commonly employed, regardless of a manual zoom lens or a powered zoom lens.

SUMMARY OF THE INVENTION

According to the present invention, in an interchangeable-lens image capture apparatus having a function of communicating with an external device, a zoom operation can be remotely performed even on a manual zoom lens from the external device.

According to an aspect of the present invention, there is provided an image capture apparatus comprising: a communication unit configured to communicate with an external device; and a control unit configured to control communications with a detachably attached lens unit and with the external device, wherein the control unit transmits a control command for a driver device received from the external device through the communication unit to the driver device via the lens unit, the driver device mechanically driving, from outside the lens unit, a zoom mechanism in the lens unit attached to the image capture apparatus.

According to another aspect of the present invention, there is provided a lens unit capable of being attached to and detached from an image capture apparatus, comprising: a zoom mechanism that can be manually operated; a first communication unit configured to communicate with the image capture apparatus; a second communication unit configured to communicate with a driver device that mechanically drives the zoom mechanism from outside the lens unit; and a control unit configured to control communication with the image capture apparatus and the driver device, wherein the control unit transmits a control command for the driver device received from the image capture apparatus through the first communication unit, to the driver device through the second communication unit.

According to a further aspect of the present invention, there is provided a driver device comprising: a driver unit configured to mechanically drive an operation member in a zoom mechanism provided in a lens unit; a lens communication unit configured to communicate with the lens unit; and a control unit configured to control an operation of the driver unit in accordance with a control command received through the lens communication unit.

According to another aspect of the present invention, there is provided an electronic device comprising: a communication unit configured to communicate with an image capture apparatus; an operation unit; and a control unit configured to, in accordance with an operation made to the operation unit, generate a zoom control command to change an angle of view of a lens unit attached to the image capture apparatus, and transmit the zoom control command to the image capture apparatus through the communication unit, wherein the zoom control command is a command to control an operation of a driver device configured to mechanically drive, from outside the lens unit, a zoom mechanism provided in the lens unit.

According to a further aspect of the present invention, there is provided a capturing system comprising: an image capture apparatus; a lens unit detachably attached to the image capture apparatus and having a zoom mechanism that can be manually operated; a driver device configured to mechanically drive the zoom mechanism from outside the lens unit, the driver device being attached to the lens unit; and an electronic device communicably connected to the image capture apparatus, the image capture apparatus comprising: a first communication unit configured to communicate with the electronic device; and a first control unit configured to control communication with the lens unit and the electronic device, wherein the first control unit transmits, to the lens unit, a control command for the driver device received from the electronic device through the first communication unit, the lens unit comprising: a second communication unit configured to communicate with the image capture apparatus; a third communication unit configured to communicate with the driver device; and a second control unit configured to control communication with the image capture apparatus and the driver device, wherein the second control unit transmits the control command for the driver device received from the image capture apparatus through the second communication unit, to the driver device through the third communication unit, the driver device comprising: a driver unit configured to mechanically drive an operation member in the zoom mechanism; a fourth communication unit configured to communicate with the lens unit; and a third control unit configured to control an operation of the driver unit in accordance with the control command received through the fourth communication unit, and the electronic device comprising: a fifth communication unit configured to communicate with the image capture apparatus; an operation unit; and a fourth control unit configured to, in accordance with an operation made to the operation unit, generate a zoom control command to change an angle of view of the lens unit and transmit the zoom control command to the image capture apparatus through the fifth communication unit, wherein the zoom control command is the control command for the driver device.

According to another aspect of the present invention, there is provided a method for controlling an image capture apparatus having a function of communicating with an external device, the method comprising: receiving, from the external device, a control command for a driver device that mechanically drives a zoom mechanism in a lens unit attached to the image capture apparatus, from outside the lens unit; and transmitting the control command to the driver device via the lens unit.

According to a further aspect of the present invention, there is provided a method for controlling a lens unit having a zoom mechanism that can be manually operated, the method comprising: receiving, from an image capture apparatus to which the lens unit is attached, a control command for a driver device that mechanically drives the zoom mechanism from outside the lens unit; and transmitting the control command for the driver device to the driver device.

According to another aspect of the present invention, there is provided a method for controlling a driver device having a driver unit that mechanically drives an operation member in a zoom mechanism provided in a lens unit, the method comprising: receiving a control command for the driver unit from the lens unit; and controlling an operation of the driver unit in accordance with the control command.

According to a further aspect of the present invention, there is provided a method for controlling an electronic device having a function of communicating with an image capture apparatus, the method comprising: detecting an operation made to an operation unit in the electronic device; generating a zoom control command to change an angle of view of a lens unit attached to the image capture apparatus, in accordance with the detected operation; and transmitting the zoom control command to the image capture apparatus, wherein the zoom control command is a command to control an operation of a driver device that mechanically drives, from outside the lens unit, a zoom mechanism provided in the lens unit.

Further features of the present invention will become apparent from the following description of exemplary embodiments (with reference to the attached drawings).

BRIEF DESCRIPTION OF THE DRAWINGS

FIG. 2 is a block diagram showing an exemplary functional configuration of a digital camera and an interchangeable lens according to an embodiment.

FIGS. 9A-1 and 9A-2 are flowcharts related to an operation of the mobile phone according to an embodiment.

FIGS. 11A-1 and 11A-2 are flowcharts related to an operation of the digital camera according to an embodiment.

FIG. 11B is a flowchart related to an operation of the digital camera according to an embodiment.

FIGS. 12A-1 and 12A-2 are flowcharts related to an operation of the digital camera according to an embodiment.

FIG. 12B is a flowchart related to an operation of the digital camera according to an embodiment.

DESCRIPTION OF THE EMBODIMENTS

Exemplary embodiments of the present invention will now be described in detail in accordance with the accompanying drawings.

First Embodiment

Summary of Remote Capturing System

Figure 1:
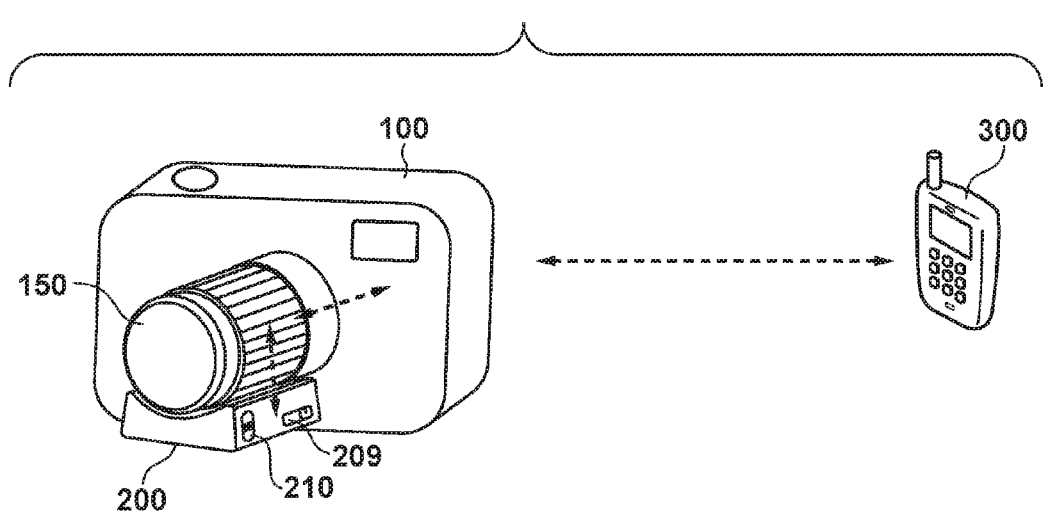
FIG. 1 is a schematic diagram showing an exemplary configuration of a capturing system according to an embodiment of the present invention.

FIG. 1 is a schematic diagram showing an exemplary configuration of a remote capturing system according to an embodiment. The remote capturing system has a digital camera (hereinafter, a camera) 100, which is an interchangeable-lens image capture apparatus having a function of communicating with an external apparatus, and a mobile phone 300, which serves as an example of an external device with which the camera 100 can communicate. Note that an interchangeable lens 150 (lens unit) having a manual zoom function is attached to the camera 100 (camera body), and a zoom adapter 200 is attached to the interchangeable lens 150. The zoom adapter 200 is an external device for mechanically driving a zoom mechanism in the interchangeable lens 150 from outside the interchangeable lens.

The camera 100 and the interchangeable lens 150 bidirectionally communicate with each other via a lens connection terminal and a camera connection terminal provided in their mounts. For example, the camera 100 transmits a command related to focus control to the interchangeable lens 150. The interchangeable lens 150 can transmit, to the camera 100, lens-specific information such as a maximum zoom position and a minimum zoom position, and information regarding a lens state such as a current focusing lens position and a zoom position.

The interchangeable lens 150 and the zoom adapter 200 bidirectionally communicate with each other via a zoom adapter connection terminal and a lens connection terminal. For example, the interchangeable lens 150 informs the zoom adapter 200 of zoom position information (current zoom position, maximum zoom position, and minimum zoom position). The zoom adapter 200 can determine whether or not a zoom operation can be performed, based on the zoom position information that the zoom adapter 200 is informed of. The zoom adapter 200 can also transmit information related to a state of the zoom adapter 200 to the interchangeable lens 150.

In this embodiment, although the camera 100 and the zoom adapter 200 are not physically connected, bidirectional communication therebetween is enabled by communicating via the interchangeable lens 150. For example, the camera 100 can grasp information from the zoom adapter 200 as a result of the interchangeable lens 150 forwarding information received from the zoom adapter 200 to the camera, or the interchangeable lens 150 informing the camera 100 of the information received from the zoom adapter 200.

Also, information can be transmitted from the camera 100 to the zoom adapter 200 as a result of the interchangeable lens 150 forwarding the information received from the camera 100 to the zoom adapter 200, or the interchangeable lens 150 informing the zoom adapter 200 of the information received from the camera 100. For example, it is possible to control operation of the zoom adapter 200 and cause the interchangeable lens 150 to change the zoom position by transmitting a zoom drive command that can be interpreted by the zoom adapter 200 from the camera 100 to the interchangeable lens 150.

The camera 100 and the mobile phone 300 bidirectionally communicate with each other through a wireless connection. Specifically, the camera 100 operates as a simple access point (simple AP) and forms a wireless LAN network. Upon operating as a simple AP, the camera 100 starts to regularly transmit a beacon signal. The mobile phone 300 detects the beacon signal, and joins the wireless LAN network formed by the camera 100. After the camera 100 has discovered the mobile phone 300, acquired capabilities thereof, and established communication therewith, bidirectional communication therebetween through the wireless LAN is enabled.

Note that the method for bidirectional communication between the camera 100 and the mobile phone 300 is not limited to the method in which the mobile phone 300 joins the network formed by the camera 100. For example, the camera 100 and the mobile phone 300 may bidirectionally communicate with each other on a wireless LAN network formed by an external access point by joining the wireless LAN. Note that the camera 100 and the mobile phone 300 do not need to be wirelessly connected, and may be connected by wire (e.g. by a USB cable).

After the communication has been established, the camera 100 can be remotely operated from the mobile phone 300 by performing given data exchange. For example, remote capturing using the camera 100 is enabled as a result of the mobile phone 300 acquiring a state of the camera 100 and transmitting an appropriate setting or capturing command to the camera 100.

Furthermore, in this embodiment, powered zoom control using the zoom adapter 200 can also be performed from the mobile phone 300. That is to say, the mobile phone 300 transmits, to the camera 100, a zoom control command addressed to the zoom adapter 200 as a command to change the angle of view of the interchangeable lens 150. Then, the camera 100 forwards this zoom control command to the interchangeable lens 150, and the interchangeable lens 150 further forwards this zoom control command to the zoom adapter 200. Thus, the zoom adapter 200 can be remotely operated from the mobile phone 300 as a result of the camera 100 and the interchangeable lens 150 relaying the control command for the zoom adapter 200 transmitted by the mobile phone 300. Accordingly, even if, for example, the interchangeable lens 150 is of a manual zoom type, zoom control of the interchangeable lens can be remotely performed from the mobile phone 300.

Next, individual devices that constitute the remote capturing system will be described.

Figures 1, 9A:
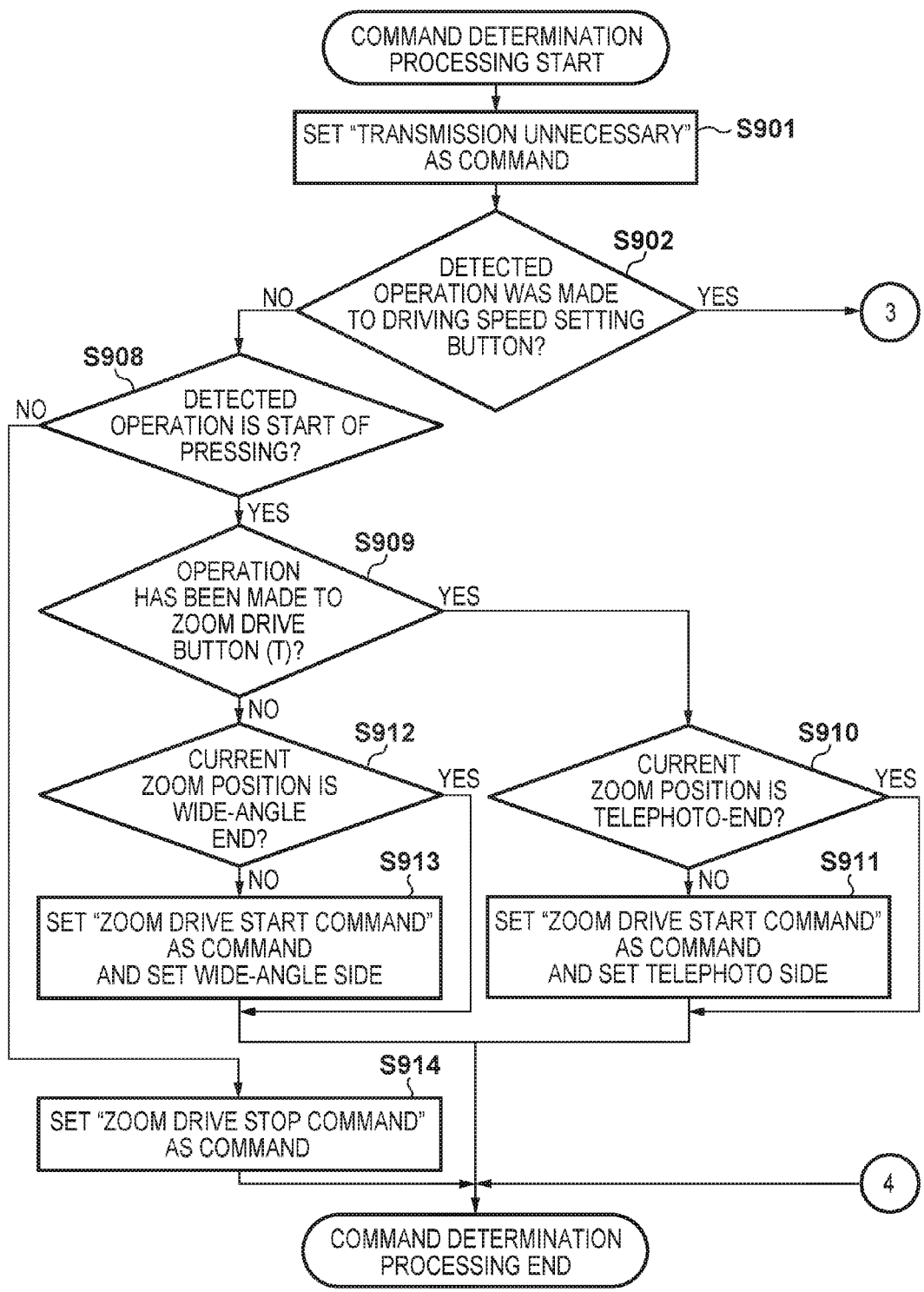
Figures 2, 9A:
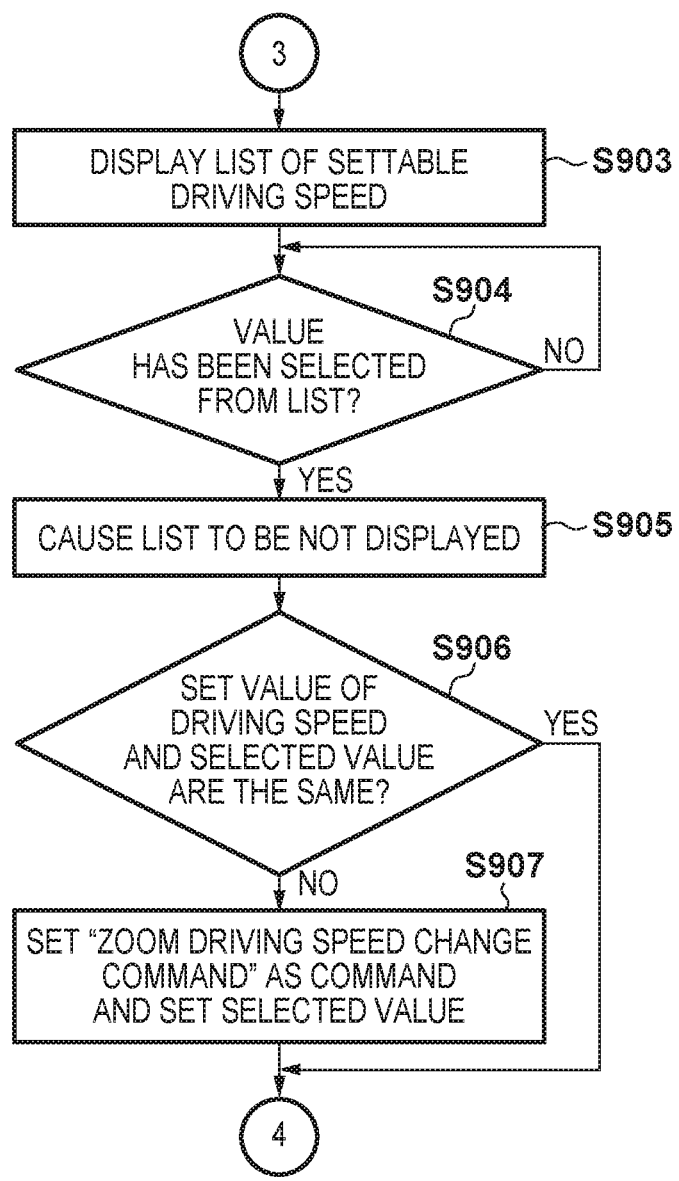

FIG. 2 is a block diagram showing an exemplary functional configuration of the camera 100 and the interchangeable lens 150. As mentioned above, the camera 100 (camera body) is of an interchangeable-lens type, and is used with the interchangeable lens 150 attached thereto.

Configuration of Digital Camera

First, a configuration of the camera 100 will be described.

The camera 100 has a lens mount for attaching the interchangeable lens 150, and a lens connection terminal 101 is provided in the lens mount. The lens connection terminal 101 includes a contact group for coming into contact with a contact group on a camera connection terminal 151 provided on the interchangeable lens 150 to supply power to the interchangeable lens 150 and communicate therewith. The camera 100 communicates, to the interchangeable lens 150, an operation state thereof, a setting state thereof, a request command regarding various kinds of information (transmission request), a focus drive command, a zoom drive command addressed to the zoom adapter 200, and the like.

A half mirror 102 reflects incident light from the interchangeable lens 150 and guides the light to a focusing screen in an optical finder. A user can check a capturing area and a focus state by observing the focusing screen through an eyepiece. At the time of capturing, the half mirror 102 withdraws from an optical path such that the incident light can reach an image capture unit 104 through an aperture of a shutter 103. The image capture unit 104 is an image sensor that converts an optical image into an electric signal.

An A/D converter 105 converts an analog electric signal that is output by the image capture unit 104 into a digital electric signal (RAW data). The image processing unit 106 applies given image processing to the RAW data from the A/D converter 105 or image data from a memory control unit 107. Examples of image processing performed by the image processing unit 106 include white balance adjustment, demosaicing, color space conversion, resizing, coding or decoding, color conversion, subject detection, calculation of evaluation values used in automatic focus detection (AF) and automatic exposure control (AE), motion vector detection, and the like. Note that these are exemplary image processing, and configuration may be such that other kinds of image processing are executed, or such that some of the above examples of processing are not performed.

A later-described camera control unit 111 executes AF (autofocus) processing, AE (auto-exposure) processing, and EF (pre-lighting of a flash 126) processing of a TTL (through-the-lens) type, using the evaluation values calculated by the image processing unit 106. AF processing can be performed by means of a contrast detection method in which the focusing lens is moved to a position at which a largest AF evaluation value for a focus detection region in a captured image is obtained. Note that one or more focus detection regions can be set. In the case of performing face detection, a face region may be included in the focus detection region.

RAW data from the A/D converter 105 is written in the memory 108 via both the image processing unit 106 and the memory control unit 107, or via only the memory control unit 107. The memory 108 is used as an image buffer for storing image data such as RAW data, image data to be displayed, and image data to be recorded. The memory 108 has a sufficient storage capacity for storing a given number of still images as well as moving images and audio for given time.

The memory 108 also serves as a video memory. A D/A converter 109 converts the image data to be displayed stored in the memory 108 into an analog signal, and supplies this analog signal to a display unit 110. Thus, the image data to be displayed written in the memory 108 is displayed by the display unit 110 via the D/A converter 109. The display unit 110 can be caused to function as an electronic view finder by capturing moving images and causing the display unit 110 to sequentially display the captured moving images. Note that image data to be displayed for causing display devices including the display unit 110 that are provided in the camera 100 or connected to the camera 100 to function as an electronic view finder will be called live view image data. The image data to be displayed includes not only the live view image data but also image data for displaying various GUIs such as a menu screen, and image data for displaying the image data recorded in a recording medium 125 on the display unit 110, but is not limited thereto.

A nonvolatile memory 112 stores programs to be executed by the camera control unit 111, constants, unique information regarding the camera 100, various set values, GUI data, and the like. At least a part of the nonvolatile memory 112 may be rewritable.

The camera control unit 111 has one or more programmable processors (hereinafter called MPUs for convenience), for example. Each part of the camera 100 is controlled to achieve various functions of the camera 100 by loading, in a system memory 113, the programs stored in the nonvolatile memory 112 and causing the MPUs in the camera control unit 111 to execute the programs. These functions include functions for achieving the remote capturing system. The functions for achieving the remote capturing system include transmission and reception, interpretation, and execution of commands related to the remote capturing system, display of GUIs associated with the remote capturing system, execution of processing corresponding to a GUI operation, and the like. The system timer 114 generates a timing signal to be used in various kinds of control.

A mode switch 119 switches the operation mode of the camera control unit 111 to one of a still image recording mode, a moving image capturing mode, a reproduction mode, and the like. Modes included in the still image recording mode are an automatic capturing mode, an automatic scene identification mode, a manual mode, various scene modes serving as capturing settings for individual capturing scenes, a program AE mode, a custom mode, and the like. The mode switch 119 enables the operation mode to be directly switched to one of these modes included in the still image capturing mode. Alternatively, a configuration in which the operation mode is first switched to the still image capturing mode using the mode switch 119, and is thereafter switched to one of these modes included in the still image capturing mode using other operation members may be employed. Similarly, the moving image capturing mode may also include a plurality of modes.

A first shutter switch 116 turns on in the middle of an operation made to a shutter button 118, i.e. when the shutter button 118 is half-pressed, and generates a first shutter switch signal SW1 (capturing preparation instruction). Upon the first shutter switch signal SW1 being generated, capturing preparation operations, such as AF (autofocus) processing, AE (auto-exposure) processing, AWB (automatic white balance) processing, and EF (pre-flashing of the flash 126) processing, are started.

A second shutter switch 117 turns on upon an operation made to the shutter button 118 being completed, i.e. when the shutter button 118 is full-pressed, and generates a second shutter switch signal SW2 (capturing instruction). Upon the second shutter switch signal SW2 being generated, the camera control unit 111 starts a series of capturing and recording operations, starting from reading out a signal from the image capture unit 104 up to writing image data in the recording medium 125. Note that a capturing operation for causing the display unit 110 to function as an electronic view finder when in a capturing standby state will be called a capturing operation for display, and a capturing operation performed due to generation of the second shutter switch signal SW2 will be called a capturing operation for recording.

Functions assigned to respective buttons, switches and the like included in an operation unit 115 may be fixed, or different functions may be assigned depending on situation. For example, functions corresponding to contents displayed on the display unit 110 may be assigned to a direction key, a decision key, and a wheel.

A power control unit 121 detects an attachment state, the type, and the remaining capacity of a power supply unit 122, the number of times of charging and discharging thereof, a voltage thereof, and the like. The power control unit 121 supplies a necessary voltage to each part, including the recording medium 125, for a necessary time period based on the detection result and an instruction from the camera control unit 111. Upon a power switch 120 being turned on, the camera control unit 111 instructs the power control unit 121 to supply power to each part.

The power supply unit 122 is a primary battery, a secondary battery, an AC adapter, or the like. A recording medium I/F 124 is an interface for communication with the recording medium 125. The recording medium 125, which is detachable, is constituted by a semiconductor memory, a magnetic disk, or the like, and is used for recording image data obtained by capturing.

A communication I/F 123 is an interface for communication with an external apparatus, and supports wired and wireless communication. Here, examples of wired communication include communication via a USB cable, a LAN cable, an HDMI (registered trade mark) cable, or the like, and examples of wireless communication include communication using a wireless LAN, Bluetooth (registered trademark), or the like. The communication I/F 123 may be a video output terminal, and can transmit an image captured by the image capture unit 104 (including a live view image) and an image recorded in the recording medium 125 to an external apparatus. Note that, in this embodiment, the camera 100 (camera control unit 111) communicates with the mobile phone 300 conforming to a wireless LAN standard via the communication I/F 123.

An audio output unit 127 may be a speaker, for example, and outputs an audio signal that is output by the camera control unit 111, as audible sound.

Configuration of Interchangeable Lens

Next, a configuration of the interchangeable lens 150 will be described. The mount provided on the interchangeable lens 150 is provided with the camera connection terminal 151. The camera connection terminal 151 includes a contact group for coming into contact with a contact group in the lens connection terminal 101 provided in the camera 100 to receive power supply from the camera 100 and communicate with the camera 100.

A lens control unit 152 has one or more programmable processors (hereinafter called MPUs for convenience), for example. Various functions of the interchangeable lens 150 including communication with the camera 100 and the zoom adapter 200 are achieved by loading programs stored in a nonvolatile memory 153 and causing the MPUs in the lens control unit 152 to execute these programs. These functions include functions for achieving the remote capturing system, or more specifically, a function of forwarding or relaying commands related to the remote capturing system, and the like. The memory 153 stores programs to be executed by the lens control unit 152, as well as characteristic information and optical information that are unique to the interchangeable lens 150, and the like.

The characteristic information is unique information that does not vary in principle, and includes information such as the name of the interchangeable lens 150 (ID information for specifying the model thereof), the maximum and minimum focal lengths, the highest communication speed, and the minimum F number. The optical information is optically unique information that varies in accordance with the angle of view, focus, the F-number, and the like, and includes information such as a current focal length, the F-number, an amount of correction (design value), and a manufacturing error value, for example.

The interchangeable lens 150 includes a diaphragm 154 whose aperture size is variable, a focusing lens 155 whose position in the optical axis direction is variable, and a variable magnification lens 156. The interchangeable lens 150 is an imaging optical system of the camera 100, and forms an optical image of a subject on an image forming plane in the image capture unit 104.

The interchangeable lens 150 also has a diaphragm motor 157 for driving the diaphragm 154, and a focus motor 159 for driving the focusing lens 155. The diaphragm motor 157 and the focus motor 159 can detect the position of the diaphragm and the focusing lens by using stepping motors as the diaphragm motor 157 and the focus motor 159 and counting the number of pulses for driving these motors after a reset operation. In the case of using other actuators as the diaphragm motor 157 and the focus motor 159, a configuration for detecting the positions of the diaphragm and the focusing lens need only be provided separately.

Operation of the diaphragm motor 157 is controlled by the lens control unit 152 through a diaphragm driver 158. Similarly, operation of the focus motor 159 is controlled by the lens control unit 152 through a focus driver 160.

A zoom operation unit 162 is a movable member that is operated by the user to vary the angle of view of the interchangeable lens 150, and is, typically, a zoom ring. The interchangeable lens 150 is provided with a movement mechanism for moving the variable magnification lens 156 along the optical axis in conjunction with a movement of the zoom operation unit 162. In this embodiment, operation of the zoom operation unit 162 and the movement mechanism are configured to be mechanically associated with each other, and the interchangeable lens 150 is a manual zoom lens.

A zoom position detection unit 161 detects the position of the variable magnification lens 156. The zoom position detection unit 161 is constituted by a potentiometer, for example, and outputs an electric signal that corresponds to the position of the variable magnification lens 156. The lens control unit 152 performs A/D conversion on the electric signal that is output by the zoom position detection unit 161, and saves the converted signal as digital data in the memory 153. If data indicating correspondence between the position of the variable magnification lens 156 and the angle of view is stored in advance in the memory 153, for example, the lens control unit 152 can obtain the current angle of view based on the output signal from the zoom position detection unit 161.

Also, by storing, in the memory 153 for example, data on correspondence between the focusing lens position and the lens-to-subject distance, and data on correspondence between the diaphragm position and the F number, the lens control unit 152 can acquire the lens-to-subject distance from the focusing lens position, and acquire the F number from the diaphragm position.

Furthermore, the interchangeable lens 150 has a zoom adapter connection terminal 163 for connecting the zoom adapter 200, which can be attached to and detached from the interchangeable lens 150. The interchangeable lens 150 bidirectionally communicates with the connected zoom adapter 200 through the zoom adapter connection terminal 163. The lens control unit 152 detects whether or not the zoom adapter 200 is connected, and saves information indicating the detection result. If the zoom adapter 200 is connected or removed, the lens control unit 152 updates the information regarding the connection of the zoom adapter 200.

Configuration of Zoom Adapter

Figure 3:
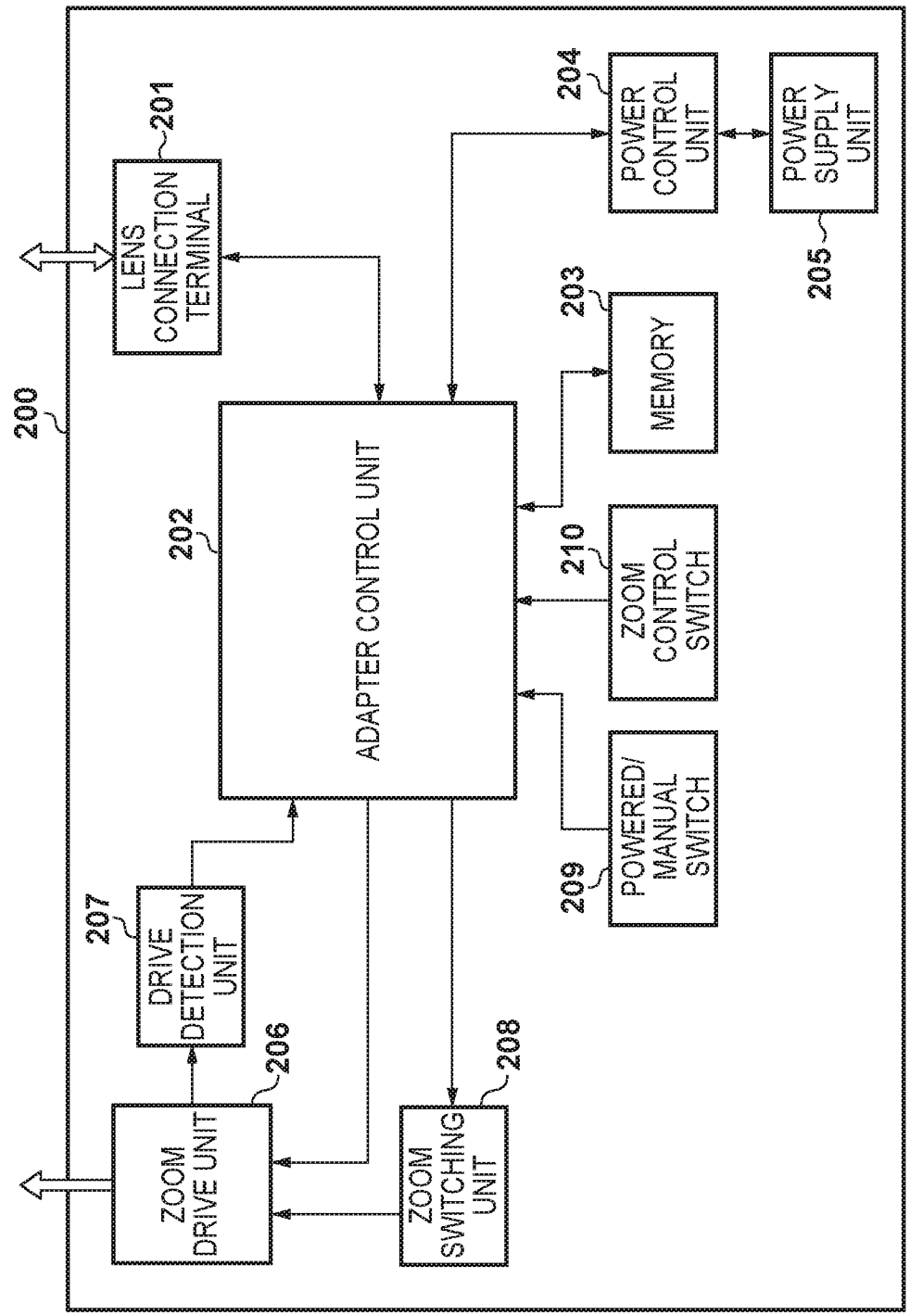
FIG. 3 is a block diagram showing an exemplary functional configuration of a zoom adapter according to an embodiment.

Next, the zoom adapter 200 to be connected to the interchangeable lens 150, which is a zoom lens, will be described with reference to FIG. 3. The zoom adapter 200 is a driver device that mechanically drives, from outside the interchangeable lens 150, an operation member (e.g. a zoom ring) of a zoom mechanism in the interchangeable lens 150 to enable powered zoom of the interchangeable lens 150. Hereinafter, driving of the zoom mechanism in the interchangeable lens 150 by using the zoom adapter 200 will be called powered zoom, and manual driving of the zoom mechanism by the user will be called manual zoom.

The zoom adapter 200 has a lens connection terminal 201 to be connected to the zoom adapter connection terminal 163 in the interchangeable lens 150, and can bidirectionally communicate with the interchangeable lens 150.

An adapter control unit 202 has one or more programmable processors (hereinafter called MPUs for convenience), for example. Various functions of the zoom adapter 200 including communication with the interchangeable lens 150 or communication with the camera 100 through the interchangeable lens 150 are achieved by loading programs stored in a nonvolatile memory 203 and causing the MPUs in the adapter control unit 202 to execute these programs. These functions include functions for achieving the remote capturing system, such as transmission and reception, as well as interpretation and execution of commands related to the remote capturing system.

The memory 203 stores the programs to be executed by the adapter control unit 202, status information and control information regarding the zoom adapter 200, and the like. The status information is various kinds of information regarding a current state of the zoom adapter 200, including information regarding the remaining capacity of a battery thereof, a setting state of a later-described powered/manual switch 209, a set value of the zoom speed, and the like. The control information is information regarding capabilities of the zoom adapter 200, items and contents that can be set from outside the zoom adapter 200, such as a list indicating settable driving speeds at the time of driving for remote zoom, and the like. A current set value of the zoom speed may be included in the control information. The adapter control unit 202 reads out the status information and the control information from the memory 203 and transmits the read information according to a request from outside the zoom adapter 200.

A power control unit 204 detects an attachment state, the type, and the remaining capacity of a power supply unit 205, the number of times of charging and discharging thereof, a voltage thereof, and the like. The power control unit 204 supplies a necessary voltage to each part for a necessary time period based on the detection result and an instruction from the adapter control unit 202. The power supply unit 205 is constituted by a primary battery such as an alkali battery or a lithium battery, a secondary battery such as a NiCd battery, a NiMH battery, or a Li battery, or the like.

A zoom drive unit 206 is an actuator that mechanically drives the zoom operation unit 162 (and the zoom mechanism associated therewith) in the interchangeable lens 150 in accordance with a command from the adapter control unit 202. For example, the zoom drive unit 206 has a driver member that is in contact with the zoom ring constituting the zoom operation unit 162, and a motor for moving (e.g.

rotating) the driver member. By rotating the driver member, the zoom drive unit 206 can rotate the zoom ring with a friction force generated between the driver member and the zoom ring, and drive the zoom mechanism within the interchangeable lens 150.

Although there is no particular restriction on the material and the shape of the driver member provided in the zoom drive unit 206, a roller, a belt, a gear, or the like having a surface shape that meshes with knurls formed on a surface of the zoom ring may be employed, for example. Alternatively, a member that generates a sufficient friction force for driving the zoom ring may be a roller, a belt, or the like that is provided on at least a surface that comes into contact with the zoom ring. Thus, the zoom adapter 200 achieves a similar operation to a manual operation of rotating the zoom ring performed by the user, through the zoom drive unit 206.

A drive detection unit 207 detects the driving direction and the driving amount of the zoom drive unit 206 and informs the adapter control unit 202 thereof.

A zoom switching unit 208 switches between enabling and disabling the driving of the zoom operation unit 162 performed by the zoom drive unit 206, in accordance with an instruction from the adapter control unit 202. For example, the zoom switching unit 208 can physically disable the driving of the zoom operation unit 162 by separating the driver member in the zoom drive unit 206 from the zoom operation unit 162, for example. Alternatively, the zoom switching unit 208 may electrically disable the driving of the zoom operation unit 162 by invalidating a drive instruction from the zoom drive unit 206.

By disabling the driving of the zoom operation unit 162 performed by the zoom drive unit 206, a conventional manual operation to the zoom operation unit 162 is enabled even in a state where the zoom adapter 200 is connected.

The adapter control unit 202 can set, for the zoom switching unit 208, whether to enable or disable the driving of the zoom operation unit 162 performed by the zoom drive unit 206 in accordance with a setting of the powered/manual switch 209, for example.

A zoom control switch 210 is a switch for performing a powered zoom operation to the interchangeable lens 150 by using the zoom adapter 200. The zoom control switch 210 may be a slide lever, for example, and the adapter control unit 202 is informed of the moving direction and the moving amount of the lever. The adapter control unit 202 controls the driving direction and the driving speed of the zoom drive unit 206 in accordance with the moving direction and the moving amount of the zoom control switch 210. Note that if manual zoom has been set by the powered/manual switch 209, the adapter control unit 202 ignores the operation of the zoom control switch 210.

Furthermore, the adapter control unit 202 can also accept a zoom control command from outside the zoom adapter 200 via the lens connection terminal 201. That is to say, upon receiving the zoom control command via the lens connection terminal 201, the adapter control unit 202 controls the zoom drive unit 206 based on the zoom control command, and executes a powered zoom operation for the interchangeable lens 150.

Configuration of Mobile Phone

Figure 4:
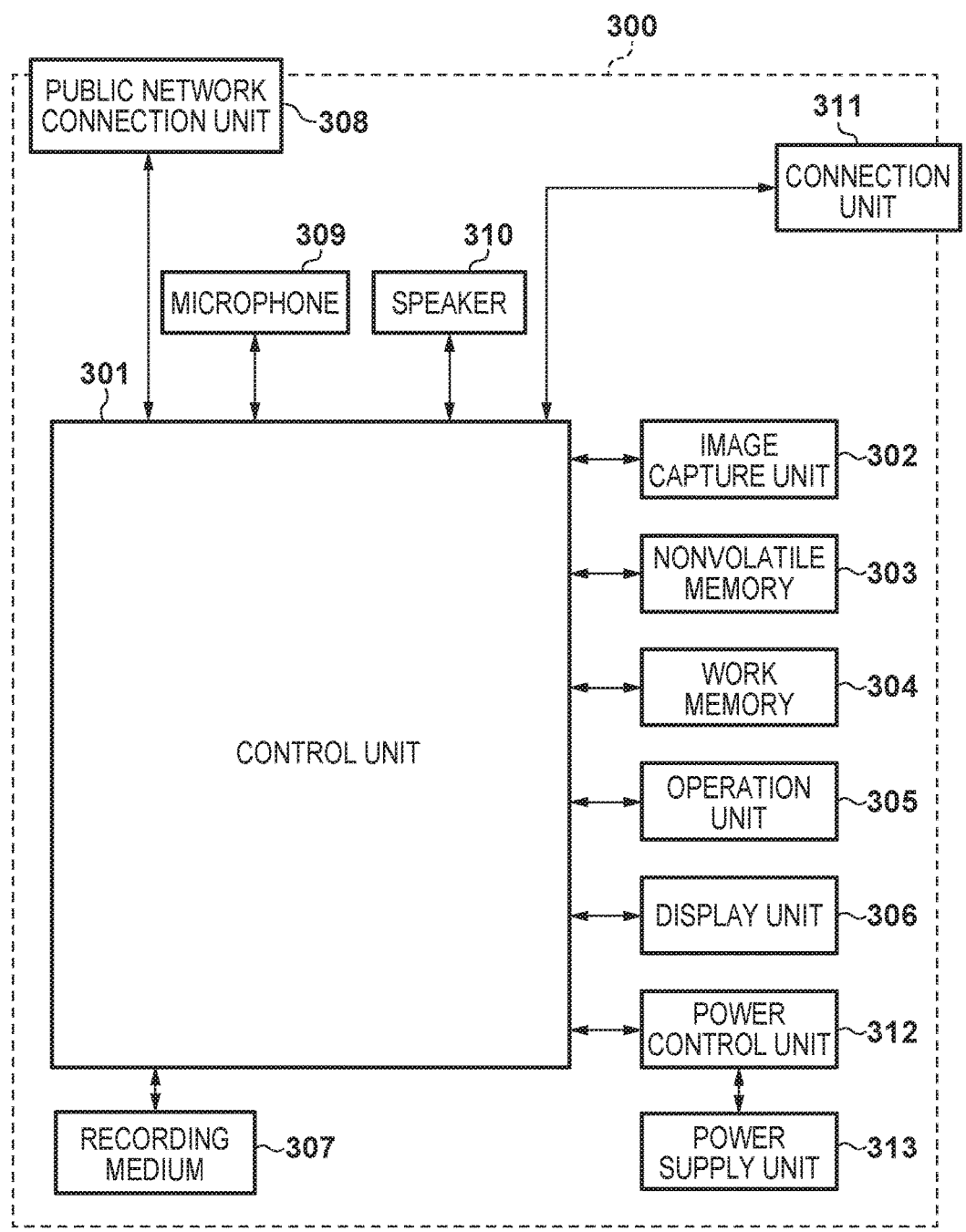
FIG. 4 is a block diagram showing an exemplary functional configuration of a mobile phone according to an embodiment.

Next, an exemplary configuration of the mobile phone 300 in FIG. 1 will be described with reference to FIG. 4. The mobile phone 300 is an example of an external apparatus with which the camera 100 can communicate, and any other electronic devices capable of communicating with the camera 100 may be used in place of the mobile phone 300. For example, such electronic devices include a digital camera, a media player, a tablet device, a personal computer, a smartphone, a game machine, and the like that have a wireless communication function, but are not limited thereto.

A control unit 301 has one or more programmable processors (hereinafter called MPUs for convenience), for example. Various functions of the mobile phone 300 such as communication with the camera 100 are achieved by loading programs stored in a nonvolatile memory 303 and causing the MPUs in the control unit 301 to execute these programs. The nonvolatile memory 303 stores programs (an OS and applications) to be executed by the control unit 301, various set values, GUI data, and the like. Note that, rather than the control unit 301 controlling the overall device, a plurality of pieces of hardware may be assigned to the control of the overall mobile phone 300.

Note that a later-described operation of the mobile phone 300 related to the remote control system is achieved as a result of the control unit 301 executing a program stored as a camera communication application in the nonvolatile memory 303. The camera communication application achieves transmission and reception, as well as interpretation and execution of commands related to the remote capturing system, display of GUIs related to the remote capturing system, execution of processing corresponding to a GUI operation, and the like. Note that the camera communication application has a program that uses a function provided by an OS operating on the mobile phone 300. Note that the OS operating on the mobile phone 300 may include a program for achieving the operation of the mobile phone 300 in this embodiment.

An image capture unit 302 is a camera module, includes an imaging optical system and an image sensor, and outputs, to the control unit 301, image data obtained by capturing based on an instruct from the control unit 301. The control unit 301 applies, to the image data, similar processing to that performed in common digital cameras, and temporarily saves the image data in a work memory 304. Thereafter, the image data is stored in an image file corresponding to a predetermined recording format, and is recorded in a recording medium 307.

The work memory 304 is used as a buffer memory for temporarily saving the image data generated by the image capture unit 302, a display memory (video memory) for the display unit 306, a work area for the control unit 301, and the like.

An operation unit 305 is an input device group for the user to input an instruction to the mobile phone 300. For example, the operation unit 305 includes a power switch, a shutter button in the image capture unit 302, a touch panel formed on the display unit 306, and the like.

A display unit 306 is used to display the image data obtained by the image capture unit 302, a user interface for an interactive operation, a text message, information regarding a call, and the like. Note that the display unit 306 does not necessarily need to be included in the mobile phone 300. The mobile phone 300 need only be able to be connected to the display unit 306 and have a function of controlling display of the display unit 306.

The recording medium 307 is a nonvolatile storage medium such as a memory card, and can record not only the image data obtained by the image capture unit 302, but also data received by the mobile phone 300, an address book, and the like. The recording medium 307 may be configured such that it can be attached to and detached from the mobile phone 300, or may be embedded in the mobile phone 300. That is to say, the mobile phone 300 need only be able to access at least the recording medium 307.

A public network connection unit 308 is an interface used for connection to a public wireless telephone network. The mobile phone 300 can be connected to a public wireless telephone network via the public network connection unit 308 to make a voice call and perform data communication with other telephones. During a call, the control unit 301 inputs and outputs audio signals via a microphone 309 and a speaker 310. In this embodiment, the public network connection unit 308 includes an interface for performing 3G communication. Note that the communication standard used here is not limited to 3G, and other communication standards such as LTE, WiMAX, ADSL, FTTH, and so-called 4G may be used.

A connection unit 311 is an interface for connection to an external apparatus. The mobile phone 300 according to this embodiment can communicate with an external apparatus via the connection unit 311. Note that, in this embodiment, the connection unit 311 includes an interface for communicating with an external apparatus conforming to a wireless LAN (IEEE 802.11x) protocol, but other wireless communication protocols such as Bluetooth may also be used. The control unit 301 achieves wireless communication with an external apparatus by controlling the connection unit 311.

Note that the mobile phone 300 according to this embodiment can operate as at least a slave device in a wireless LAN infrastructure mode, and can join a network formed by an AP located therearound. The connection unit 311 and the public network connection unit 308 do not necessarily need to be constituted by independent pieces of hardware, and may be achieved by common hardware.

A power control unit 312 detects an attachment state, the type, and the remaining capacity of a power supply unit 313, the number of times of charging and discharging thereof, a voltage thereof, and the like. The power control unit 312 supplies a necessary voltage to each part for a necessary time period based on the detection result and an instruction from the control unit 301. The power supply unit 313 is constituted by a primary battery such as an alkali battery or a lithium battery, a secondary battery such as a NiCd battery, a NiMH battery, or a Li battery, an AC adapter, or the like.

A description will be given below of operations of each device for achieving remote capturing using the camera 100 from the mobile phone 300 in the remote capturing system.

Operation of Digital Camera

Figure 5A:
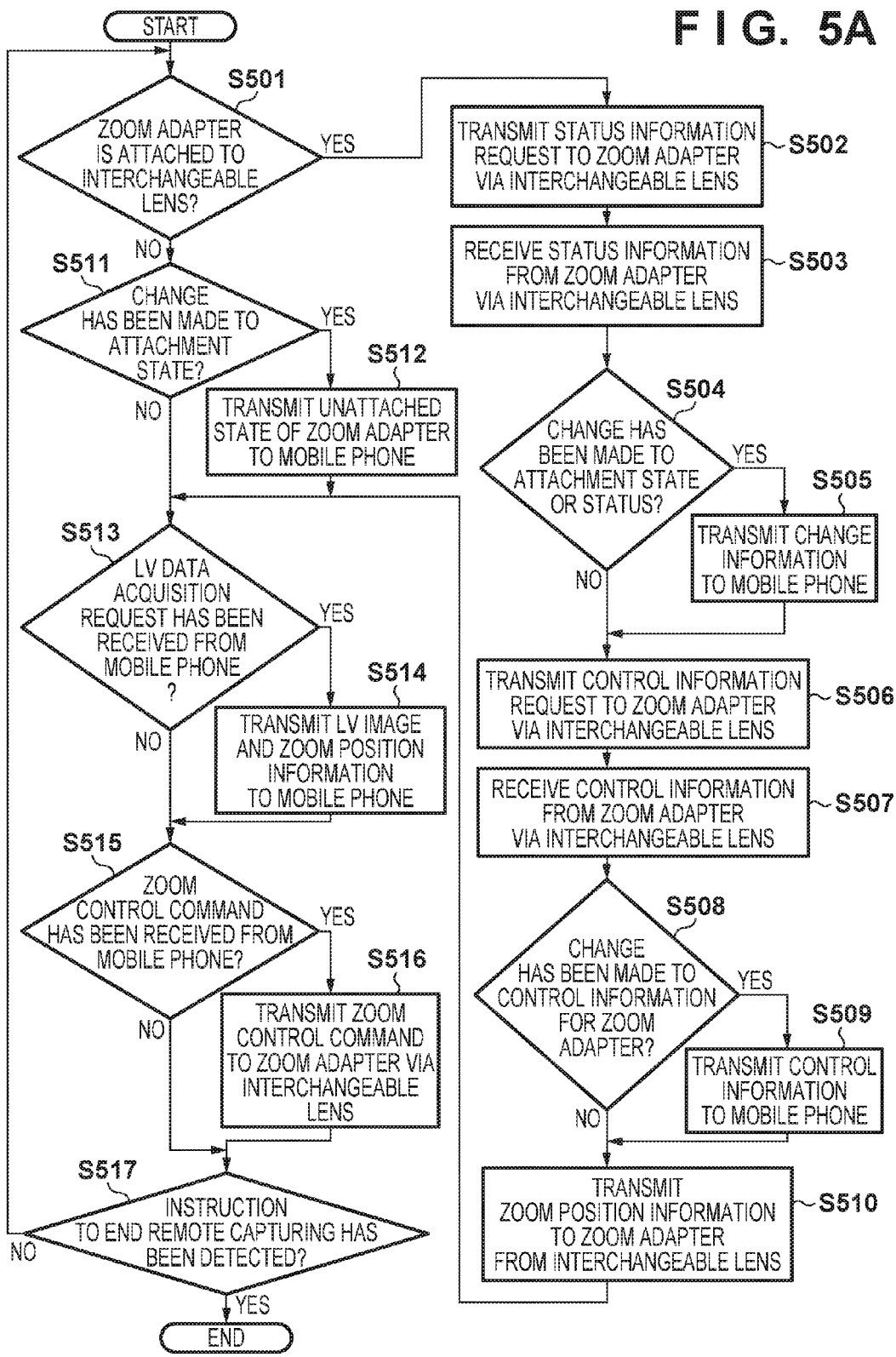
FIG. 5A is a flowchart related to an operation of the digital camera according to an embodiment.

First, operation of the camera 100 will be described using a flowchart in FIG. 5A. The operation shown in FIG. 5A is started when communication between the mobile phone 300 and the camera 100 has been established, and an instruction to start a remote capturing operation has been given from the camera communication application on the mobile phone 300 to the camera 100, for example. Note that, during a remote capturing operation, the camera 100 regularly (e.g. at a given frame rate) generates a live view image and transmits this live view image to the mobile phone 300. The camera 100 may generate the live view image to be transmitted to the mobile phone 300 at a resolution that is appropriate for the display unit 306 on the mobile phone 300, or may transmit the same live view image as that to be displayed on the display unit 110 to the mobile phone 300. The mobile phone 300 displays the live view image received from the camera 100 on a live view image region of the camera communication application, thereby causing the live view image region to function as an external EVF of the camera 100.

Note that, in the following description, processing performed by the camera 100 is achieved as a result of, in practice, the MPUs provided in the camera control unit 111 executing a program stored in the nonvolatile memory 112 and controlling other constituent elements as necessary. Similarly, processing performed by the interchangeable lens 150 is achieved as a result of the MPUs provided in the lens control unit 152 executing a program stored in the memory 153 and controlling other constituent elements as necessary. Processing performed by the zoom adapter 200 is achieved as a result of the MPUs provided in the adapter control unit 202 executing a program stored in the memory 203 and controlling other constituent elements as necessary. Furthermore, processing performed by the mobile phone 300 is achieved as a result of the MPUs provided in the control unit 301 executing a program (in particular, the camera communication application) stored in the nonvolatile memory 303 and controlling other constituent elements as necessary.

Although the camera 100 and the zoom adapter 200 directly transmit and receive data to/from each other in the following description, in practice, bidirectional communication between the camera 100 and the zoom adapter 200 is achieved as a result of the interchangeable lens 150 relaying or forwarding data. Note that the lens control unit 152 can identify whether the data received from the camera 100 and the zoom adapter 200 is to be forwarded, by referencing header information, for example.

In step S501, the camera 100 acquires information from the interchangeable lens 150 and determines whether or not the zoom adapter 200 is attached to the interchangeable lens 150. If it is determined that the zoom adapter 200 is attached, the camera 100 advances the processing to step S502, and if it is not determined that the zoom adapter 200 is attached, the camera 100 advances the processing to step S511.

In step S502, the camera 100 transmits, to the interchangeable lens 150, a status information request addressed to the zoom adapter 200. As mentioned above, if the interchangeable lens 150 identifies that a destination of the request is the zoom adapter 200, the interchangeable lens 150 forwards the request to the zoom adapter 200.

In step S503, the camera 100 receives, via the interchangeable lens 150, the status information transmitted from the zoom adapter 200 in response to the request in step S502. This status information is transmitted by the zoom adapter 200 in later-described step S602 in FIG. 6A, and is forwarded by the interchangeable lens 150.

In step S504, the camera 100 determines whether or not a change has been made to the attachment state or the status information regarding the zoom adapter 200, advances the processing to step S505 if it is determined that a change has been made, and advances the processing to step S506 if it is not determine that a change has been made.

In step S505, the camera 100 transmits the attachment state and the status information regarding the zoom adapter 200 to the mobile phone 300. Note that only the attachment state or the status information that has been changed may be transmitted. The attachment state and the status information may be transmitted at different timings.

In step S506, the camera 100 transmits a control information request to the zoom adapter 200, via the interchangeable lens 150.

In step S507, the camera 100 receives the control information transmitted from the zoom adapter 200 in response to the request in step S506, via the interchangeable lens 150. This status information is transmitted by the zoom adapter 200 in step S604 in FIG. 6A, and is forwarded by the interchangeable lens 150.

In step S508, the camera 100 determines whether or not a change has been made to the control information regarding the zoom adapter 200, advances the processing to step S509 if it is determined that a change has been made, and advances the processing to step S510 if it is not determined that a change has been made. Note that, at first determination, the camera 100 determines that a change has been made (YES).

In step S509, the camera 100 transmits the control information to the mobile phone 300.

In step S510, the camera 100 requests the interchangeable lens 150 to transmit the zoom position information to the zoom adapter 200. The zoom position information includes the current zoom position, the maximum zoom position, and the minimum zoom position of the interchangeable lens 150. These positions may be represented by angles of view or variable magnification lens positions. Note that configuration may be such that the maximum zoom position and the minimum zoom position are not transmitted every time in this step, and are transmitted only once when communication between the interchangeable lens 150 and the zoom adapter 200 is enabled.

On the other hand, in step S511, the camera 100 determines whether or not a change has been made to the attachment state of the zoom adapter 200, advances the processing to step S512 if it is determined that a change has been made, and advances the processing to step S513 if it is not determined that a change has been made. In step S511, it is determined that a change has been made (YES) only at first determination, or at the time of determination performed immediately after the zoom adapter 200 has been removed.

In step S512, the camera 100 informs the mobile phone 300 that the zoom adapter 200 is not attached.

In step S513, the camera 100 determines whether or not a live view data acquisition request has been newly received from the mobile phone 300, advances the processing to step S514 if it is determined that the request has been received, and advances the processing to step S515 if it is not determined that the request has been received. Here, the live view data acquisition request is transmitted from the mobile phone 300 in later-described step S713 in FIG. 7B.

In step S514, the camera 100 transmits live view data including the live view image and the zoom position information to the mobile phone 300. Note that the live view image and the zoom position information may be transmitted at different timings. Configuration may be such that the maximum zoom position and the minimum zoom position included in the zoom position information are not transmitted in this step, and are transmitted only when communication between the camera 100 and the mobile phone 300 has been enabled, or when the interchangeable lens 150 has been replaced. Note that the live view data can include any other information, such as information regarding current capturing conditions (shutter speed, F number, ISO speed etc.), the position and size of a focus detection region and a subject region (e.g. face region), and various settings of the camera 100. As a result of the mobile phone 300 displaying such information together with the live view image, the live view image region on the display unit 306 can be caused to function as a similar EVF to the display unit 110 of the camera 100.

In step S515, the camera 100 determines whether or not a new zoom control command has been received from the mobile phone 300, advances the processing to step S516 if it is determined that a new zoom control command has been received, and advances the processing to step S517 if it is not determined that a new zoom control command has been received. Here, the zoom control command is transmitted from the mobile phone 300 in step S722 in FIG. 7B. In a state where the zoom adapter 200 is not attached, a control command is not generated from the mobile phone 300, and therefore, it is not determined in this step that a zoom control command has been received. Note that, in this embodiment, one or more of a zoom drive speed change command, zoom drive start command, and a zoom drive stop command are transmitted as the zoom control commands, and the zoom adapter executes processing corresponding to the command type (details will be described later). The zoom drive start command includes designation of a direction (telephoto-side or wide-angle side).

In step S516, the camera 100 transmits the zoom control command from the mobile phone 300 to the zoom adapter 200 via the interchangeable lens 150.

In step S517, the camera 100 determines whether or not an instruction to end remote capturing has been given, ends the processing shown in FIG. 5A if it is determined that the instruction to end remote capturing has been given, and returns the processing to step S501 if it is not determined that the instruction to end remote capturing has been given. The instruction to end remote capturing may be given through the operation unit 115 in the camera 100, or may be received from the mobile phone 300.

Operation of Interchangeable Lens

Figure 5B:
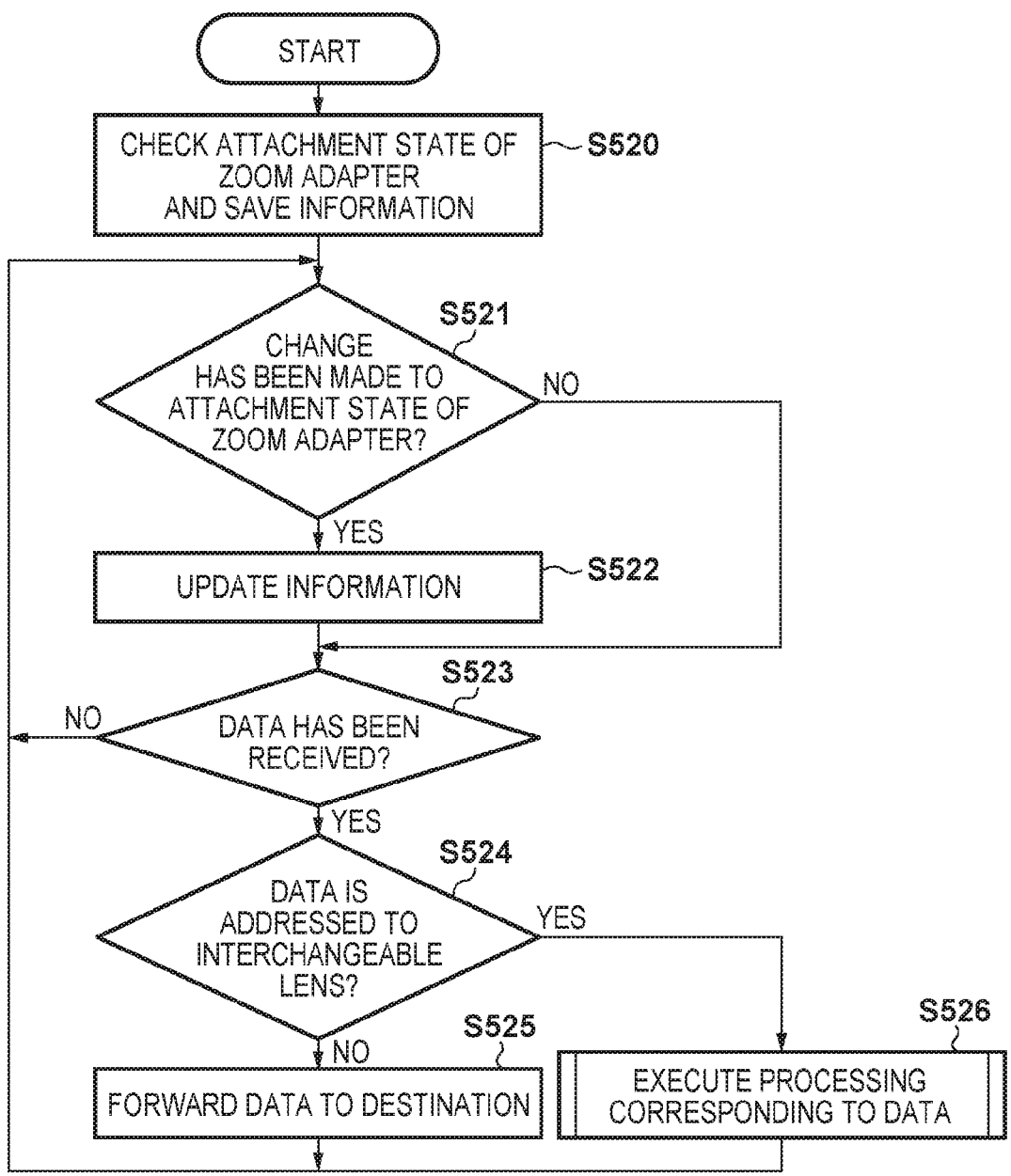
FIG. 5B is a flowchart related to an operation of an interchangeable lens according to an embodiment.

Next, operation of the interchangeable lens 150 will be described using a flowchart in FIG. 5B. The operation shown in FIG. 5B is started when the interchangeable lens 150 is attached to the camera 100.

In step S520, the interchangeable lens 150 checks the attachment state of the zoom adapter 200 (i.e. whether or not the zoom adapter 200 is attached), and saves information indicating the attachment state in the memory 153.

In step S521, the interchangeable lens 150 determines whether or not a change has been made to the attachment state of the zoom adapter 200, advances the processing to step S522 if it is determined that a change has been made, and advances the processing to step S523 if it is not determined that a change has been made.

In step S522, the interchangeable lens 150 updates the information indicating the attachment state saved in the memory 153. At this time, the interchangeable lens 150 may inform the camera 100 of the change in the attachment state of the zoom adapter 200.

In step S523, the interchangeable lens 150 determines whether or not data has been received from the camera 100 or the zoom adapter 200, advances the processing to step S524 if it is determined that the data has been received, and returns the processing to step S521 if it is not determined that the data has been received.

In step S524, the interchangeable lens 150 determines whether or not the received data is addressed to the interchangeable lens 150, advances the processing to step S526 if it is determined that the received data is addressed to the interchangeable lens, and advances the processing to step S525 if it is not determined that the received data is addressed to the interchangeable lens. As mentioned above, the destination of the received data can be determined from the information contained in the header of the data, for example, but may be determined by other methods, such as from the content of the data (e.g. command type).

In step S525, the interchangeable lens 150 forwards the data received in step S523 to the destination (the zoom adapter 200 or the camera 100), and returns the processing to step S521. Note that, in the case of forwarding the data, the data may be forwarded as-is, or may be forwarded after the transmission source of the data is changed to the interchangeable lens 150.

In step S526, the interchangeable lens 150 executes processing corresponding to the received data, and returns the processing to step S521. The processing performed in step S526 includes processing for transmitting characteristic information and optical information regarding the interchangeable lens 150, transmitting the zoom position information to the zoom adapter 200, and driving the focusing lens and the diaphragm according to the request from the camera 100, but is not limited thereto.

Operation of Zoom Adapter

Figure 6A:
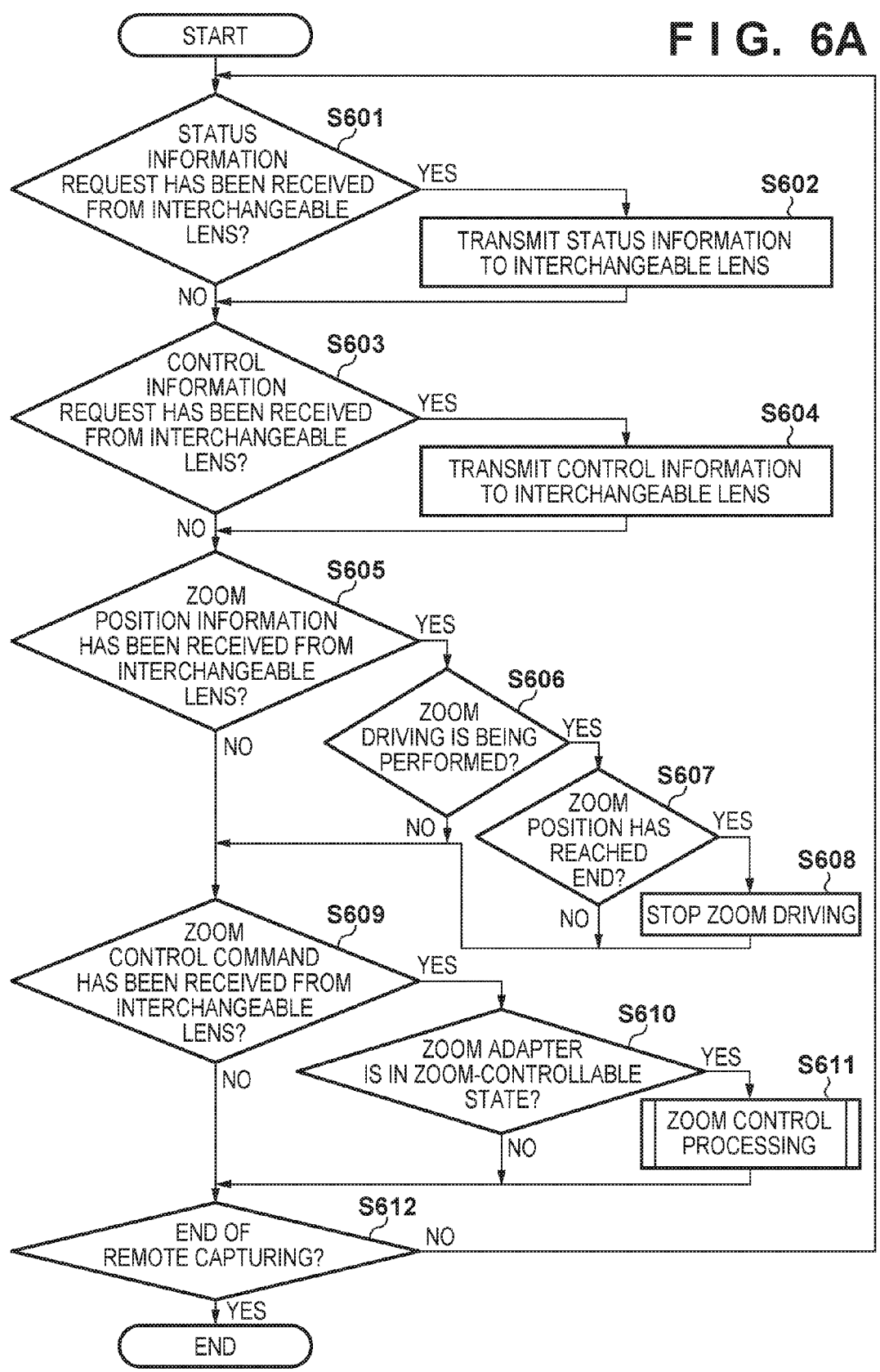
FIG. 6A is a flowchart related to an operation of the zoom adapter according to an embodiment.

Next, operation of the zoom adapter 200 will be described using a flowchart in FIG. 6A. The operation shown in FIG. 6A is executed with the zoom adapter 200 attached to the interchangeable lens 150.

In step S601, the zoom adapter 200 determines whether or not a status information request has been received from the interchangeable lens 150, advances the processing to step S602 if it is determined that the request has been received, and advances the processing to step S603 if it is not determined that the request has been received. The received status information request is transmitted from the camera 100 via the interchangeable lens 150 in step S502 in FIG. 5A.

In step S602, the zoom adapter 200 informs the interchangeable lens 150 of the status information. Note that if the transmission source of the status information request received from the interchangeable lens 150 is the camera 100, the zoom adapter 200 may transmit the status information to the camera 100 via the interchangeable lens 150. The zoom adapter 200 transmits the information to the transmission source of the request, and the same applies to other processing.

In step S603, the zoom adapter 200 determines whether or not a control information request has been received from the interchangeable lens 150, advances the processing to step S604 if it is determined that the request has been received, and advances the processing to step S605 if it is not determined that the request has been received. The received control information request is transmitted from the camera 100 via the interchangeable lens 150 in step S506 in FIG. 5A.

In step S604, the zoom adapter 200 transmits the control information to the interchangeable lens 150.

In step S605, the zoom adapter 200 determines whether or not the zoom position information has been received from the interchangeable lens 150, advances the processing to step S606 if it is determined that the zoom position information has been received, and advances the processing to step S609 if it is not determined that the zoom position information has been received. The received zoom position information is transmitted in accordance with an instruction from the camera 100 by the interchangeable lens 150 in step S510 in FIG. 5A.

In step S606, the zoom adapter 200 determines whether or not the zoom drive unit 206 is performing zoom drive, advances the processing to step S607 if it is determined that the zoom drive unit 206 is performing zoom drive, and advances the processing to step S609 if it is not determined that the zoom drive unit 206 is performing zoom drive.

In step S607, the zoom adapter 200 determines whether or not the current zoom position is the telephoto end or the wide-angle end, based on the zoom position information regarding the interchangeable lens 150. If it is determined that the zoom position of the interchangeable lens 150 is the telephoto end or the wide-angle end, the zoom adapter 200 advances the processing to step S608, and if it is not determined that the zoom position is the telephoto end or the wide-angle end, the zoom adapter 200 advances the processing to step S609.

In step S608, the zoom adapter 200 stops the zoom drive of the zoom drive unit 206.

In step S609, the zoom adapter 200 determines whether or not a zoom control command has been received from the interchangeable lens 150, advances the processing to step S610 if it is determined that the command has been received, and advances the processing to step S612 if it is not determined that the command has been received. The zoom control command received here is transmitted to the camera 100 by the mobile phone 300 in step S722 in FIG. 7B, and is transmitted by the camera 100 in step S516 in FIG. 5A.

In step S610, the zoom adapter 200 determines whether or not the zoom adapter 200 is in a controllable state, advances the processing to step S611 if it is determined that the zoom adapter 200 is in a controllable state, and advances the processing to step S612 if it is not determined that the zoom adapter 200 is in a controllable state. In this embodiment, it is determined that the zoom adapter 200 is in a controllable state, except for the case where zoom drive of the interchangeable lens cannot be performed, such as the case where the remaining capacity of the power supply is low, or the case where manual zoom has been set by the powered/manual switch 209, but determination conditions are not limited thereto.

In step S611, the zoom adapter 200 performs zoom control processing. Here, the zoom control command received via the interchangeable lens 150 includes one or more of a zoom drive start command, a zoom drive stop command, and a zoom drive speed setting command, and the zoom adapter 200 performs processing corresponding to the type of the control command. Details of the control processing will be described later.

In step S612, the zoom adapter 200 determines whether or not an instruction to end remote capturing has been given, ends the processing shown in FIG. 6A if it is determined that the instruction to end remote capturing has been given, and returns the processing to step S601 if it is not determined that the instruction to end remote capturing has been given. The camera 100 may inform of the instruction to end remote capturing in step S517 in FIG. 5A, or a state where communication with the interchangeable lens 150 has not been performed for a fixed time may be regarded as the instruction to end remote capturing.

Details of the zoom control processing performed by the zoom adapter 200 in step S611 will be described using a flowchart in FIG. 6B.

In step S651, the zoom adapter 200 determines whether or not a drive command is included in the zoom control command received from the camera 100 via the interchangeable lens 150, advances the processing to step S652 if it is determined that the drive command is included, and advances the processing to step S657 if it is not determined that the drive command is included. Here, the drive command is a start command or a stop command.

In step S652, the zoom adapter 200 determines whether or not the zoom control command received from the camera 100 is a start command, advances the processing to step S653 if it is determined that the received zoom control command is a start command, and advances the processing to step S655 if it is not determined that the received zoom control command is a start command (i.e. if the received zoom control command is a stop command).

In step S653, the zoom adapter 200 reads out a set value of the zoom drive speed stored in the memory 203.

In step S654, the zoom adapter 200 starts to drive the zoom drive unit 206 in the direction designated in the start command at a driving speed according to the set value that is read out in step S653, and advances the processing to step S657.

On the other hand, in step S655, the zoom adapter 200 determines whether or not the zoom drive unit 206 is performing zoom drive, advances the processing to step S656 if it is determined that the zoom drive unit 206 is performing zoom drive, and advances the processing to step S657 if it is not determined that the zoom drive unit 206 is performing zoom drive.

In step S656, the zoom adapter 200 stops the driving of the zoom drive unit 206, and advances the processing to step S657.

Figure 6B:
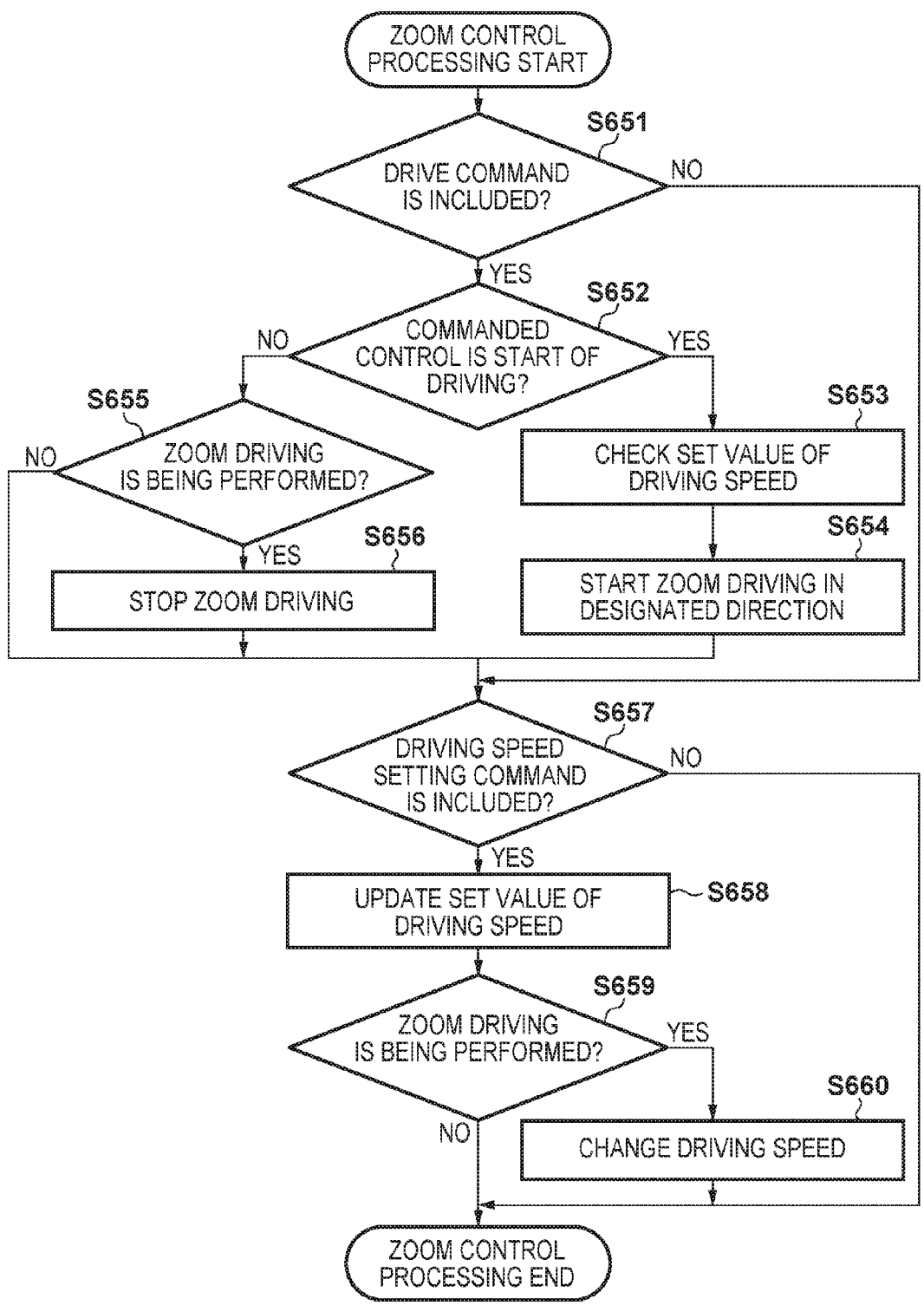
FIG. 6B is a flowchart related to an operation of the zoom adapter according to an embodiment.

In step S657, the zoom adapter 200 determines whether or not a zoom drive speed setting command is included in the zoom control command that has been received from the camera 100, advances the processing to step S658 if it is determined that the zoom drive speed setting command is included, and ends the processing in FIG. 6B if it is not determined that the zoom drive speed setting command is included. In step S658, the zoom adapter 200 updates the set value of the zoom drive speed stored in the memory 203 to a value included in the setting command. Note that configuration may be such that the set value is not updated if the value included in the setting command is the same as the current set value.

In step S659, the zoom adapter 200 determines whether or not the zoom drive unit 206 is performing zoom drive, advances the processing to step S660 if it is determined that the zoom drive unit 206 is performing zoom drive, and ends the processing in FIG. 6B if it is not determined that the zoom drive unit 206 is performing zoom drive.

In step S660, the zoom adapter 200 changes the speed while continuing the driving of the zoom drive unit 206, and ends the zoom control processing shown in FIG. 6B.

Operation of Mobile Phone

Figure 7A:
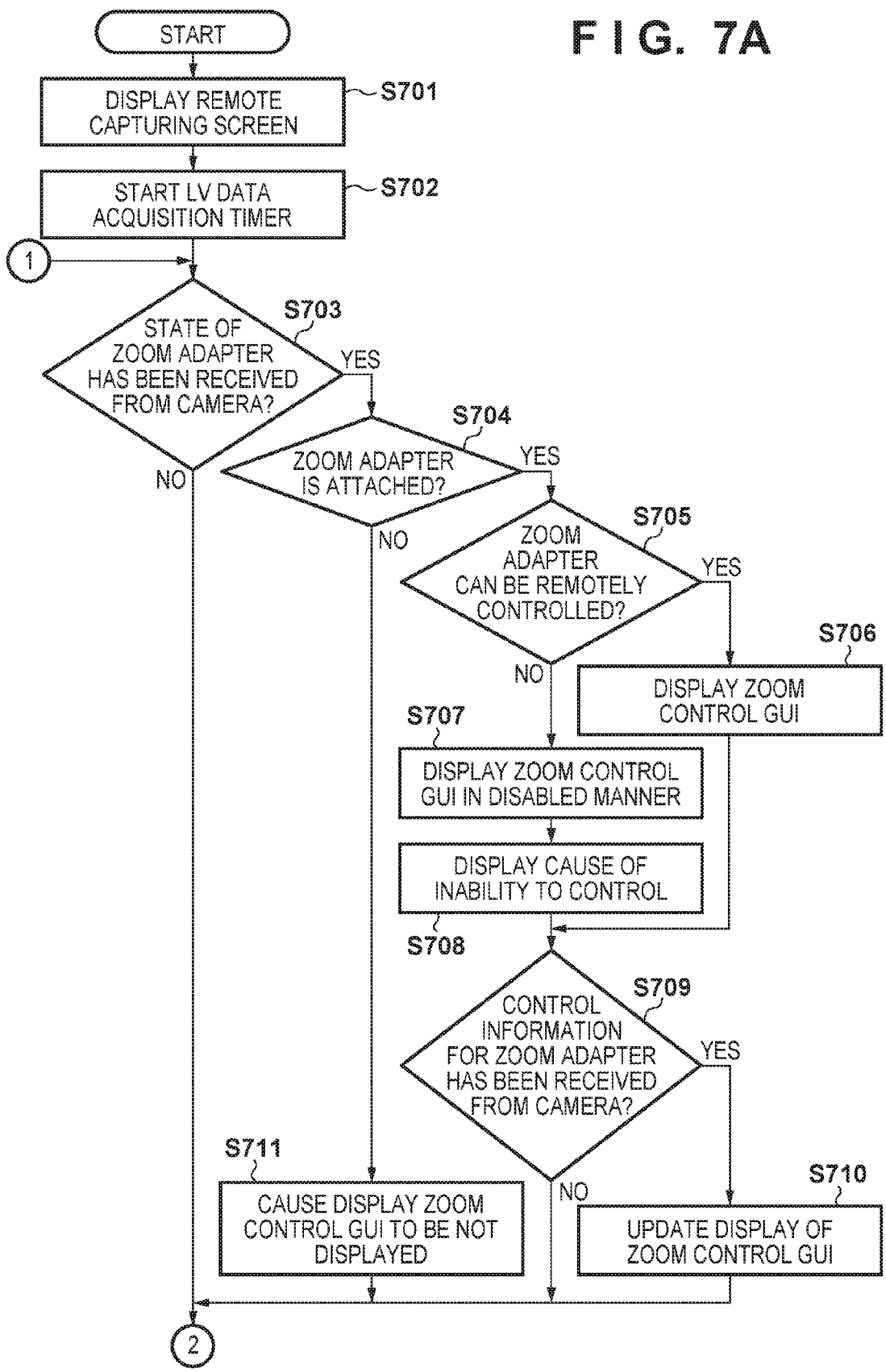
FIGS. 7A and 7B are flowcharts related to an operation of the mobile phone according to an embodiment.
Figure 7B:
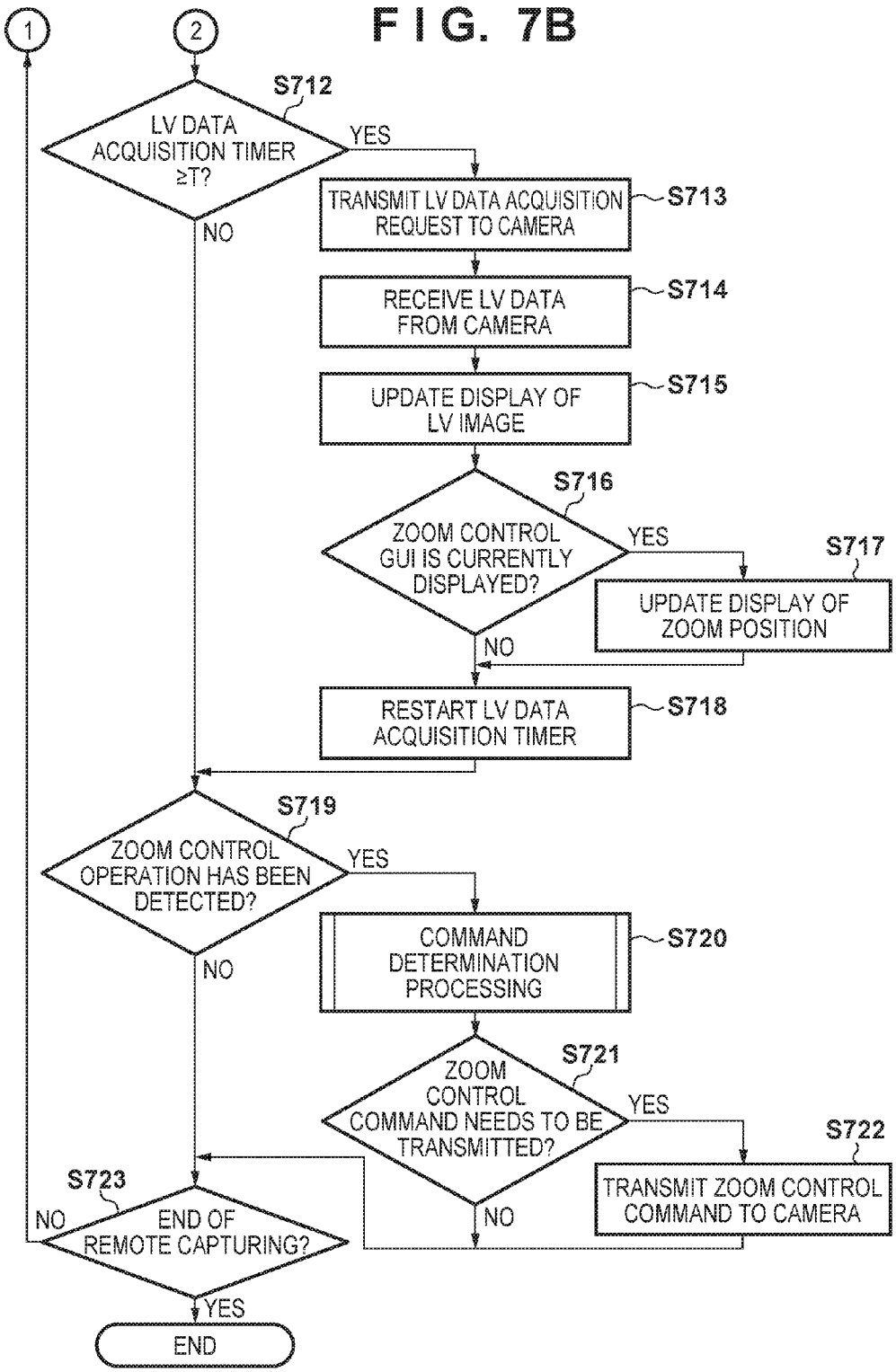

Next, operation of the mobile phone 300 will be described using flowcharts in FIGS. 7A and 7B. The operation shown in FIGS. 7A and 7B is started when communication between the mobile phone 300 and the camera 100 has been established, and an instruction to start a remote capturing operation has been given from the camera communication application on the mobile phone 300 to the camera 100, for example.

In step S701, the mobile phone 300 displays a remote capturing control screen on the display unit 306. Note that a configuration in which the display unit 306 is a touch panel display, and remote capturing is controlled through a touch operation made to the display unit 306 will be described below. Therefore, the display unit 306 displays a screen containing a GUI for touch operation. However, a configuration may be employed in which functions for controlling remote capturing are assigned to physical input devices such as numeric keys provided on the mobile phone 300, and a relationship regarding the assignment between the keys and the functions, in place of the GUI for touch operation, is displayed on the display unit 306. In the case of using a personal computer or the like in place of the mobile phone 300, a GUI may be operated with a combination of keyboards and a pointing device.

In step S702, the mobile phone 300 causes a live view data acquisition timer, which is used to regularly acquire a live view image from the camera 100, to start to count up.

In step S703, the mobile phone 300 determines whether or not information regarding a state of the zoom adapter 200 (the attachment state or the status information) has been received from the camera 100, advances the processing to step S704 if it is determined that the information has been received, and advances the processing to step S712 if it is not determined that the information has been received. The information regarding the attachment state or the status of the zoom adapter 200 received here is transmitted from the camera 100 in step S505 or S512 in FIG. 5A.

In step S704, the mobile phone 300 determines whether or not the zoom adapter 200 is attached, based on the information regarding the attachment state of the zoom adapter 200, advances the processing to step S705 if it is determined that the zoom adapter 200 is attached, and advances the processing to step S711 if it is not determined that the zoom adapter 200 is attached.

In step S705, the mobile phone 300 determines whether or not the zoom adapter 200 is in a controllable state, based on the status information regarding the zoom adapter 200. If it is determined that the zoom adapter 200 is in a controllable state, the mobile phone 300 advances the processing to step S706, and if it is not determined that the zoom adapter 200 is in a controllable state, the mobile phone 300 advances the processing to step S707.

In step S706, the mobile phone 300 displays a zoom control GUI in an enabled state (operable state) on the display unit 306. This GUI may be displayed within or out of the remote capturing control screen displayed in step S701.

On the other hand, in step S707, the mobile phone 300 displays the zoom control GUI in a disabled state (inoperable state) on the display unit 306.

In step S708, the mobile phone 300 displays, on the display unit 306, a cause of inability to perform remote zoom control. The cause displayed here is based on the information regarding the status of the zoom adapter 200 received from the camera 100, and may be that the power supply voltage is insufficient, or that manual zoom is set, for example.

In step S709, the mobile phone 300 determines whether or not control information regarding the zoom adapter 200 has been received from the camera 100, advances the processing to step S710 if it is determined that the control information has been received, and advances the processing to step S712 if it is not determined that the control information has been received. The control information received here is transmitted from the camera 100 in step S509 in FIG. 5A.

In step S710, the mobile phone 300 updates the display of the zoom control GUI displayed on the display unit 306, in accordance with the control information. Specifically, the mobile phone 300 can change the display of the zoom drive speed in accordance with a set value of the current zoom drive speed included in the control information and change a settable value range based on a settable value list for the zoom drive speed, but the updating is not limited thereto.

On the other hand, if it is not determined in step S704 that the zoom adapter 200 is attached, in step S711, the mobile phone 300 causes the zoom control GUI to be not displayed on the display unit 306. Accordingly, if the zoom control GUI is already displayed on the display unit 306, the mobile phone 300 causes the zoom control GUI to be not displayed, and if the zoom control GUI is not displayed, the mobile phone 300 leaves the display unchanged.

In step S712, the mobile phone 300 determines whether or not the count of the live view data acquisition timer is greater than or equal to a predetermined value T, advances the processing to step S713 if it is determined that the count is greater than or equal to the predetermined value, and advances the processing to step S719 if it is not determined that the count is greater than or equal to the predetermined value.

In step S713, the mobile phone 300 transmits a live view data acquisition request to the camera 100.

In step S714, the mobile phone 300 receives live view data, which includes a live view image and zoom position information, from the camera 100. The live view image and the zoom position information received here are transmitted from the camera 100 in step S514 in FIG. 5A.

In step S715, the mobile phone 300 updates the display of the live view image region on the display unit 306, using the live view image received in step S714. The live view image region may be a part of the remote capturing screen displayed in step S701, for example.

In step S716, the mobile phone 300 determines whether or not the zoom control GUI is currently displayed on the display unit 306, advances the processing to step S717 if it is determined that the zoom control GUI is currently displayed, and advances the processing to step S718 if it is not determined that the zoom control GUI is currently displayed. Note that, here, it may also be determined that the zoom control GUI is currently displayed in the case of the zoom control GUI displayed in a disabled state.

In step S717, the mobile phone 300 updates the display of the zoom position information regarding the interchangeable lens 150 on the zoom control GUI.

In step S718, the mobile phone 300 resets the live view data acquisition timer, and again causes it to start (restarts) to count up.

In step S719, the mobile phone 300 determines whether or not a zoom control operation has been detected, advances the processing to step S720 if it is determined that a zoom control operation has been detected, and advances the processing to step S723 if it is not determined that a zoom control operation has been detected. Here, the mobile phone 300 can determine that a zoom control operation has been detected when an operation made to the zoom control GUI through the touch panel provided on the display unit 306 or an operation made to a key, a button, or the like to which a zoom control operation is assigned is detected. Alternatively, the determination may be made in accordance with other conditions, such as an instruction made by audio input.

If the zoom adapter 200 is not attached to the interchangeable lens 150, or if the remote zoom control of the zoom adapter 200 is disabled, the zoom control GUI is not displayed, or is inoperable. Accordingly, it is not determined in step S719 that a zoom control operation has been detected.

In step S720, the mobile phone 300 performs, in accordance with the detected zoom control operation, processing for determining a zoom control command for the zoom adapter 200 that is to be transmitted to the camera 100 (command determination processing; details will be described later using FIG. 9). In the command determination processing, the mobile phone 300 also determines whether or not a zoom control command needs to be transmitted. For example, the mobile phone 300 can determine that an impossible or invalid zoom control command does not need to be transmitted, as in the case where a zoom control operation is performed to zoom to the telephoto-side (wide-angle side) when the current zoom position is the telephoto end (wide-angle end).

If, as a result of the command determination processing in step S720, it is determined that the zoom control command related to the zoom control operation detected in step S719 is a command that needs to be transmitted, in step S721, the mobile phone 300 advances the processing to step S722, and if it is not determined that the command needs to be transmitted, the mobile phone 300 advances the processing to step S723.

In step S722, the mobile phone 300 transmits, to the camera 100, the zoom control command regarding which the determination has been performed in step S720. Specific correspondence between the zoom control operations and the zoom control commands will be described later using FIGS. 8A to 9B.

In step S723, the mobile phone 300 determines whether or not an instruction to end remote capturing has been given, ends the processing shown in FIGS. 7A and 7B if it is determined that the instruction to end remote capturing has been given, and returns the processing to step S703 if it is not determined that the instruction to end remote capturing has been given. The mobile phone 300 may be informed of the instruction to end remote capturing from the camera 100 in step S517 in FIG. 5A, or the instruction to end remote capturing may be an instruction to end the camera communication application given through a touch operation made to the display unit 306 or an operation made to the operation unit 305.

Description of Application: GUI

As mentioned above, in this embodiment, the remote capturing control from the mobile phone 300 is enabled by an operation made to the GUI displayed on the display unit 306 by the camera communication application operating on the mobile phone 300. A GUI operation can be executed by a touch operation if the display unit 306 is a touch display, or an operation made to a key or a pointing device if the display unit 306 is not a touch display.

FIGS. 8A to 8E schematically show examples of the remote capturing screen and remote operation GUIs that are provided by the camera communication application in this embodiment. Here, as an example in the case where the display unit 306 on the mobile phone 300 is a touch display, a configuration in which the mobile phone 300 is a smartphone is described.

The remote capturing screen includes a live view image region 801 and a setting button 803, as well as a remote capturing button 802 and a zoom control GUI 804 that serve as the remote operation GUIs.

The live view image that is regularly received from the camera 100 by the mobile phone 300 is displayed in the live view image region 801, which thus functions as an external EVF of the camera 100. The display in the live view image region 801 is updated in step S715 in FIG. 7B. A configuration may be employed in which a focus detecting position can be designated through a position-designating operation (e.g. a tap operation) made to the live view image region 801. For example, upon detecting a tap operation made to the live view image region 801, the mobile phone 300 can transmit, to the camera 100, a capturing preparation request including information regarding the position of this tap operation. The camera 100 can set a focus detection region based on the position information included in the capturing preparation request, and execute automatic focus detection and automatic exposure control.

The remote capturing button 802 is a button for giving the camera 100 a capturing instruction. Upon a tap operation being made to the remote capturing button 802, the mobile phone 300 transmits a capturing request to the camera 100. Upon receiving the capturing request, the camera 100 executes capturing processing in accordance with settings.

The setting button 803 is a button for changing display settings for the application. In this embodiment, two types of GUIs are provided as the zoom control GUIs, and upon the setting button 803 being pressed, the mobile phone 300 switches the type of GUI to be displayed.

The zoom control GUI 804 is a GUI for remotely controlling the zoom adapter 200 from the camera communication application. As described using FIGS. 7A and 7B, the presence of display and the display mode of the zoom control GUI 804 change in accordance with whether or not the zoom adapter 200 is attached to the interchangeable lens 150, or a change in the status of the zoom adapter 200, for example.

A zoom position region 805 is a region for displaying a zoom position of the interchangeable lens 150, and in this embodiment, the current zoom position relative to the wide-angle end and the telephoto end is relatively indicated using a colored bar 8051. In this embodiment, the left end and the right end of the zoom position region 805 are assigned respectively to the wide-angle end and telephoto end, and a relative zoom position is indicated by the position of the bar 8051. Note that the method for displaying the zoom position is not limited thereto, and any other methods, such as displaying a value of the zoom position information transmitted from the camera 100 (e.g. the current angle of view, and the minimum and maximum angles of view), can be used.

Figure 8A:
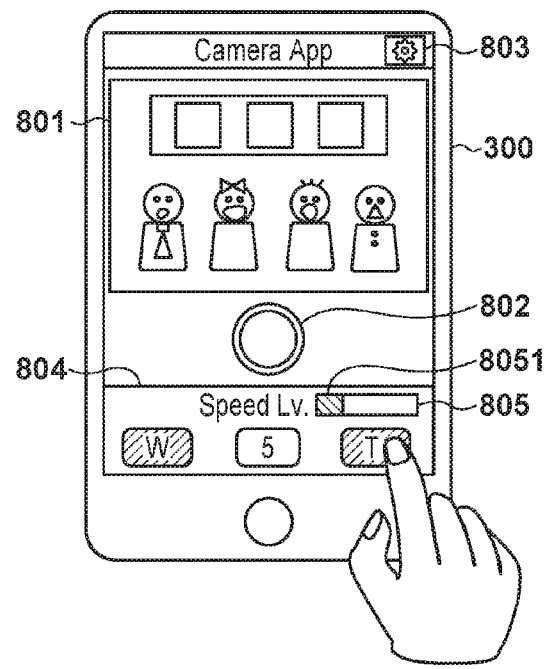
FIGS. 8A to 8E are diagrams showing exemplary GUIs provided by an application that operates on the mobile phone according to an embodiment.

In this embodiment, as the zoom control GUI 804, two types of GUIs, namely a constant-speed zoom control GUI and a variable-speed zoom control GUI are provided, and a configuration in which the user can switch between these two types of GUI when in use is employed. Note that FIG. 8A shows a state where the constant-speed zoom control GUI is displayed as the zoom control GUI 804. Regarding the two types of zoom control GUIs, a description will be given below of the GUIs, an operation method thereof, control performed on the mobile phone 300, and an appropriate use case.

Description of Application: Constant-Speed Zoom Control GUI

Figure 8B:
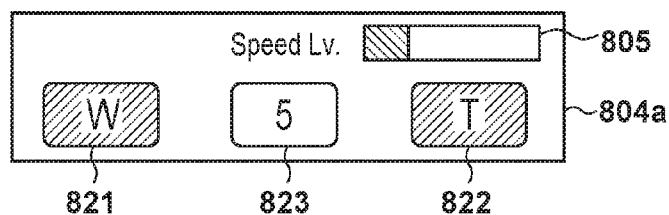

FIG. 8B is a schematic diagram showing an example of a constant-speed zoom control GUI 804a serving as the zoom control GUI 804. The constant-speed zoom control GUI 804a is configured to set the driving speed and give instructions to start and stop zoom drive separately.

The constant-speed zoom control GUI 804a has a zoom drive button (W) 821 for giving an instruction of zoom drive to the wide-angle side, a zoom drive button (T) 822 for giving an instruction of zoom drive to the telephoto-side, and a driving speed setting button 823.

Upon the zoom drive button 821 or 822 being pressed, a zoom drive command is transmitted to the camera 100 while the pressing is continued, such that zoom drive in the direction corresponding to the pressed button is continuously performed at a driving speed displayed on the driving speed setting button 823. Note that the initial value of the value displayed on the driving speed setting button 823 is a current set value of the driving speed received from the camera 100 in step S710 in FIG. 7A.

Figure 8C:
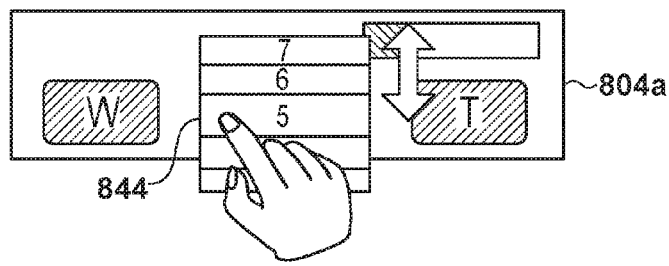

FIG. 8C shows an example of a settable driving speed list 844 that is displayed when the driving speed setting button 823 is pressed on the constant-speed zoom control GUI 804a. The current set value is displayed at the position of the driving speed setting button 823, and settable values are selectably displayed in an up-down direction in a list form. The list 844 is scrollable, and the user can designate a set value of the zoom drive speed by scrolling the list 844 as necessary and tapping a desired set value. If the set value is changed, the value displayed on the driving speed setting button 823 is also updated to the changed value.

The constant-speed zoom control GUI 804a has a configuration suitable for performing zoom drive control at a fixed zoom drive speed that is set using the driving speed setting button 823. The constant-speed zoom control GUI 804a is a GUI that is suitable for the case where the user wants to zoom in on, or zoom out of, a person or an object at a fixed speed for presentation when recording a movie work or a music program, for example.

FIGS. 9A-1 and 9A-2 are flowcharts related to the command determination processing performed in step S720 in FIG. 7B when the mobile phone 300 determines in step S719 that an operation made to the constant-speed zoom control GUI 804a has been detected. An operation made to the constant-speed zoom control GUI 804a is one of the pressing of the driving speed setting button 823, a start or stop of the pressing of the zoom drive button (W) 821, and a start or stop of the pressing of the zoom drive button (T) 822. If it is determined that one of these operations has been performed, the mobile phone 300 executes the command determination processing shown in FIGS. 9A-1 and 9A-2. The mobile phone 300 determines in step S721 in FIG. 7B whether or not a command needs to be transmitted, based on the command that is set when the command determination processing ends.

In step S901, the mobile phone 300 sets "transmission unnecessary" as an initial value of a command that is to be transmitted to the camera 100.

In step S902, the mobile phone 300 determines whether or not the driving speed setting button 823 has been operated, advances the processing to step S903 if it is determined that the driving speed setting button 823 has been operated, and advances the processing to step S908 if it is not determined that the driving speed setting button 823 has been operated.

In step S903, the mobile phone 300 displays the settable driving speed list 844 as shown in FIG. 8C.

In step S904, the mobile phone 300 waits for a value in the list 844 displayed in step S903 to be selected, and advances the processing to step S905 upon detecting a value selecting operation.

In step S905, the mobile phone 300 causes the list 844 displayed in step S903 to be not displayed.

In step S906, the mobile phone 300 determines whether or not the set value selected from the list 844 is the same as the set value that is currently set for the zoom adapter 200, and advances the processing to step S907 if it is not determined that the values are the same.

In step S907, the mobile phone 300 sets a zoom drive speed change command as the command that is to be transmitted to the camera 100, sets the set value selected from the list 844 as a parameter of the zoom drive speed change command, and ends the command determination processing.

On the other hand, if it is determined in step S906 that the set value selected from the list 844 is the same as the set value that is currently set for the zoom adapter 200, the mobile phone 300 ends the command determination processing without changing the set command (i.e. in a state where "transmission unnecessary" is set). This is because a request to set the zoom drive speed does not need to be made.

In step S908, the mobile phone 300 determines whether the detected operation is a start of the pressing or an end of the pressing, and branches the processing. Note that step S908 is executed when the zoom drive button (W) 821 or the zoom drive button (T) 822 has been operated. If it is determined that the detected operation is a start of the pressing, the mobile phone 300 advances the processing to step S909. If the detected operation is an end of the pressing of the operated item, the mobile phone 300 advances the processing to step S914.

In step S909, the mobile phone 300 determines whether the detected operation has been made to the zoom drive button (W) 821 or the zoom drive button (T) 822, advances the processing to step S910 if it is determined that the detected operation has been made to the zoom drive button (T), and advances the processing to step S912 if it is determined that the detected operation has been made to the zoom drive button (W).

In step S910, the mobile phone 300 determines whether or not the zoom position of the interchangeable lens 150 is the telephoto end, ends the command determination processing if it is determined that the zoom position is the telephoto end, and advances the processing to step S911 if it is not determined that the zoom position is the telephoto end. Note that it can be determined whether or not the current zoom position is the telephoto end based on the information received from the camera 100 in step S714 in FIG. 7B. If the current zoom position is the telephoto end, the interchangeable lens 150 cannot be further driven to the telephoto-side, and therefore, the mobile phone 300 ends the command determination processing without changing the set command (i.e. in a state where "transmission unnecessary" is set).

In step S911, the mobile phone 300 sets a zoom drive start command as the command that is to be transmitted to the camera 100, sets the telephoto-side as a driving direction parameter of the zoom drive start command, and ends the command determination processing.

On the other hand, if the pressing of the zoom drive button (W) is started, in step S912, the mobile phone 300 determines whether or not the zoom position of the interchangeable lens 150 is the wide-angle end, ends the command determination processing if it is determined that the zoom position is the wide-angle end, and advances the processing to step S913 if it is not determined that the zoom position is the wide-angle end. Note that it can be determined whether or not the current zoom position is the wide-angle end based on the information received from the camera 100 in step S714 in FIG. 7B. If the current zoom position is the wide-angle end, the interchangeable lens 150 cannot be further driven to the wide-angle side, and therefore, the mobile phone 300 ends the command determination processing without changing the set command (i.e. in a state where "transmission unnecessary" is set).

In step S913, the mobile phone 300 sets the zoom drive start command as the command that is to be transmitted to the camera 100, sets the wide-angle side as a driving direction parameter of the zoom drive start command, and ends the command determination processing.

If it is determined in step S908 that the operation made to the zoom drive button is not a start of the pressing (i.e. in the case of an end of the pressing), in step S914, the mobile phone 300 sets a zoom drive stop command as the command that is to be transmitted to the camera 100, and ends the command determination processing.

The command that is set through the above command determination processing is transmitted to the camera 100 in step S722 unless "transmission unnecessary" is set. Then, the command is transmitted from the camera 100 to the zoom adapter 200 through the interchangeable lens 150, and zoom drive according to the command is executed. Thus, a zoom operation can be remotely made to the interchangeable lens 150, which is a manual zoom lens, from the mobile phone 300.

Description of Application: Variable-Speed Zoom Control GUI

Figure 8D:
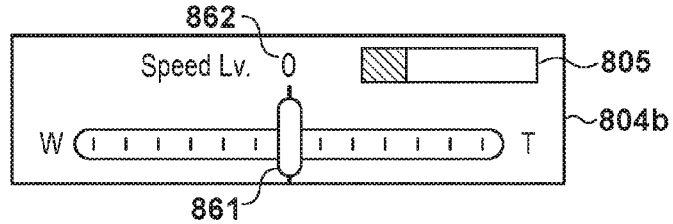

Next, a description will be given of the variable-speed zoom control GUI, which is provided as the other zoom control GUI 804. FIG. 8D is a schematic diagram showing an example of the variable-speed zoom control GUI 804*b*. The variable-speed zoom control GUI 804*b* is configured such that the driving speed is set and instructions to start and stop zoom drive are given through an operation made to one GUI component (here, a slider).

The variable-speed zoom control GUI 804*b* has a zoom drive slider 861. The mobile phone 300 displays the zoom drive slider 861, which can be moved in the left-right direction, with the center of a movable area thereof as an initial position (0). Upon a selected state of the zoom drive slider 861 being canceled, the mobile phone 300 restores the display position of the zoom drive slider 861 to the initial position. The zoom drive slider 861 may be restored to the initial position while being moved at a given speed, or the zoom drive slider 861 may be jumped to the initial position.

The zoom direction (telephoto-side or wide-angle side) is designated by the moving direction (operation direction) of the zoom drive slider 861 relative to the initial position, and the driving speed is designated by the moving distance (operation amount) thereof from the initial position. For example, an operation of moving (dragging) the zoom drive slider 861 from the center to the right by one mark corresponds to the designation of zoom drive to the telephoto-side at a driving speed 1. The mobile phone 300 transmits, to the camera 100, a drive command for achieving zoom drive control according to the position of the zoom drive slider 861. If the zoom drive slider 861 is moved to the initial position, the mobile phone 300 transmits the zoom drive stop command to the camera 100.

Marks are provided in the movable range of the zoom drive slider 861, and each mark corresponds to one of the settable driving speeds. Every time the zoom drive slider 861 moves across one mark, the set value of the zoom drive speed is changed. If, in step S710 in FIG. 7A, the content of the settable value list for the zoom drive speed has been changed, the mobile phone 300 updates the display of the number and the position of the marks in accordance with the changed list. As a method for changing the position of the marks, (a total number of settable values×2+1) marks may be displayed at equal intervals with the movable area of the zoom drive slider 861 as a fixed length. Also, a configuration may be employed in which the interval between adjacent marks is fixed and the size of the movable area of the zoom drive slider 861 is changed so as to be able to display (a total number of settable values×2+1) marks. Note that configuration may be such that the settable values and the position of the marks are not displayed at a correct scale. Also, configuration may be such that mark position information is used only in internal processing, and the marks are not displayed.

Zoom drive is stopped when the zoom drive slider 861 is at the initial position, and therefore, if the driving speed is configured to change every time the zoom drive slider 861 moves across a mark, the driving speed increases or decreases by one step at a time. Accordingly, if the zoom drive slider 861 is moved from the initial position, zoom drive is always started from the driving speed 1. For example, if the user wants to change the set value of the driving speed by two or more steps at a time, a zoom control command corresponding to the position at the time when the zoom drive slider 861 entered a state of not moving across any mark for a certain time period may be transmitted to the camera 100.

The mobile phone 300 displays the current set value of the driving speed on a display region 862 on the variable-speed zoom control GUI 804b. If the zoom drive slider 861 is in a range within one mark from the initial position, the mobile phone 300 displays 0, which indicates a stop of zoom drive, as the zoom drive speed.

With the variable-speed zoom control GUI 804b, the zoom drive speed can be successively changed by operating the zoom drive slider 861. For example, in the case of zooming while viewing the live view image and tracking a moving subject, it is conceivable that the variable-speed zoom control GUI 804b, which is capable of readily changing the zoom speed in accordance with the speed and direction of the movement of the subject, is suitable.

Figure 9B:
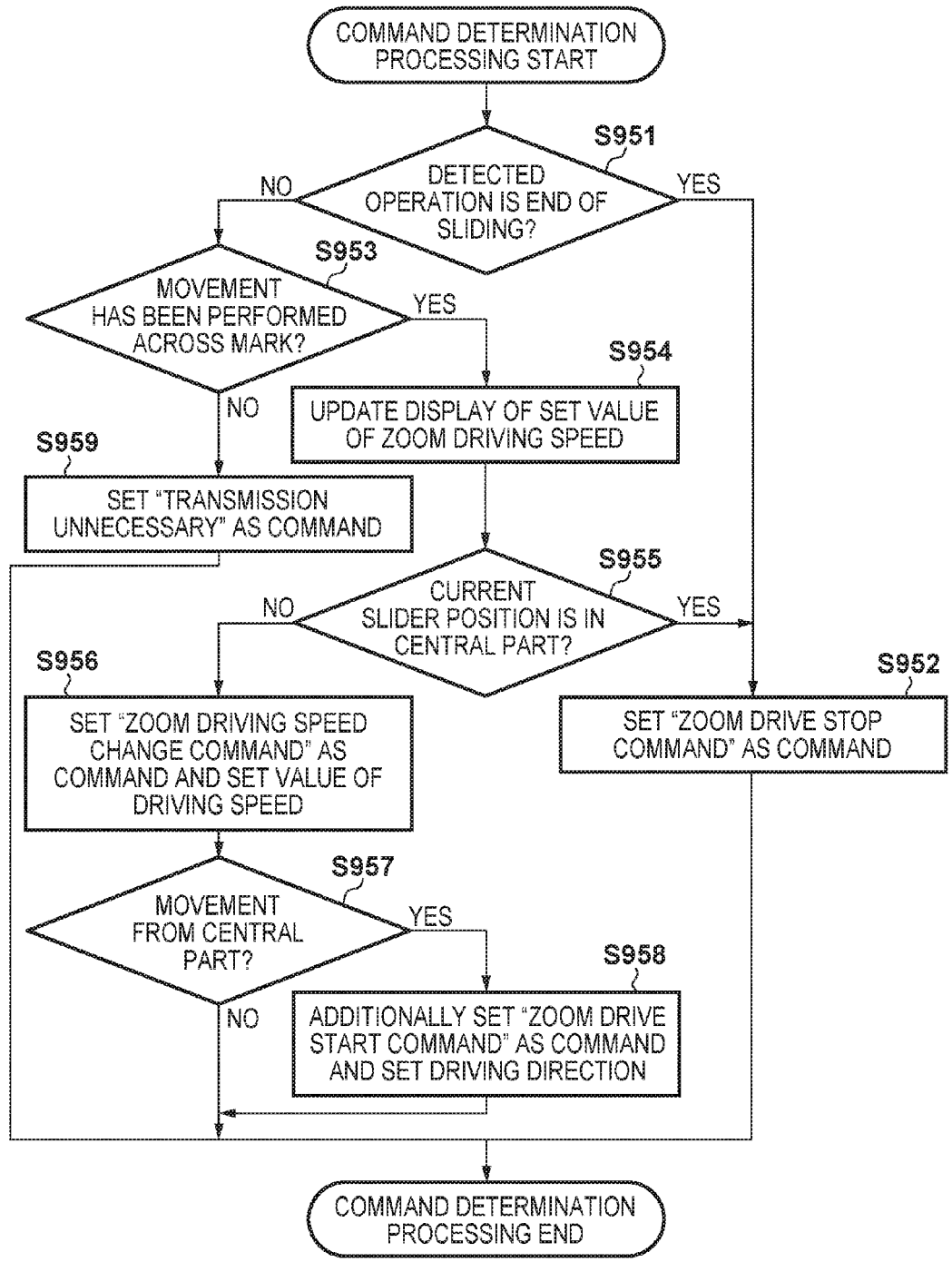
FIG. 9B is a flowchart related to an operation of the mobile phone according to an embodiment.

FIG. 9B is a flowchart related to the command determination processing performed in step S720 when the mobile phone 300 determines in step S719 in FIG. 7B that an operation has been made to the variable-speed zoom control GUI 804b. An operation made to the variable-speed zoom control GUI 804b is one of a movement of the zoom drive slider 861 and an end of the movement thereof (cancellation of a selected state of the zoom drive slider 861). If it is determined that one of these operations has been performed, the mobile phone 300 executes the command determination processing shown in FIG. 9B. The mobile phone 300 determines in step S721 in FIG. 7B whether or not a command needs to be transmitted, based on the command that is set at the end of the command determination processing.

In step S951, the mobile phone 300 determines whether or not the detected operation is an end of the sliding, advances the processing to step S952 if it is determined that the detected operation is an end of the sliding, and advances the processing to step S953 if it is not determined that the detected operation is an end of the sliding.

In step S952, the mobile phone 300 sets the zoom drive stop command as the command that is to be transmitted to the camera 100, and ends the command determination processing shown in FIG. 9B.

In step S953, the mobile phone 300 determines whether or not the position of the zoom drive slider 861 has moved across a mark due to the detected operation, advances the processing to step S954 if it is determined that the position thereof has moved across a mark, and advances the processing to step S959 if it is not determined that the position thereof has moved across a mark.

In step S959, the mobile phone 300 sets "transmission unnecessary" as the command that is to be transmitted to the camera 100, and ends the command determination processing.

In step S954, the mobile phone 300 determines the value of the zoom drive speed to be displayed in the display region 862, and updates the display. For example, the mobile phone 300 can determine the set value of the changed zoom drive speed, based on the current position of the zoom drive slider 861, the position of each mark, and the list of the settable values of the driving speed. For example, if the zoom drive slider 861 has moved across a second mark on the right side from the center and is located in an area that does not reach a third mark, the mobile phone 300 determines a second lowest value in the settable value list as the zoom drive speed to be set, and updates the display in the display region 862. Note that, if the zoom drive slider 861 is located in a central part (i.e. an area that does not extend beyond any mark from the initial position), the mobile phone 300 displays 0 in the display region 862.

In step S955, the mobile phone 300 determines whether or not the zoom drive slider 861 is located in the central part, advances the processing to step S952 if it is determined that the zoom drive slider 861 is located in the central part, and advances the processing to step S956 if it is not determined that the zoom drive slider 861 is located in the central part.

In step S956, the mobile phone 300 sets a zoom drive speed change command as the command that is to be transmitted to the camera 100, and sets the zoom drive speed displayed in the display region 862 as a parameter of the zoom drive speed change command.

In step S957, the mobile phone 300 determines whether or not the zoom drive slider 861 is located at a position other than the central part (i.e. has moved to a position separate from the initial position by one or more marks). If it is determined that the zoom drive slider 861 is located at a position other than the central part, the mobile phone 300 advances the processing to step S958, and ends the command determination processing if it is not determined that the zoom drive slider 861 is located at a position other than the central part.

In step S958, the mobile phone 300 sets a zoom drive start command, in addition to the zoom drive speed change command that is set in step S956, as the commands to be transmitted to the camera 100. Also, the mobile phone 300 sets the telephoto-side as the parameter of the zoom drive start command if the position of the zoom drive slider 861 is on the right side of the initial position, sets the wide-angle side thereas if the position of the zoom drive slider 861 is on the left side, and ends the command determination processing.

The command that is set through the above command determination processing is transmitted to the camera 100 in step S722 unless "transmission unnecessary" is set. Then, the command is transmitted from the camera 100 to the zoom adapter 200 through the interchangeable lens 150, and zoom drive according to the command is executed. Thus, a zoom operation can be remotely made to the interchangeable lens 150, which is a manual zoom lens, from the mobile phone 300.

Note that, regarding the marks used in the processing in FIG. 9B, the position thereof need only be able to be used for comparison, and the marks do not need to be displayed, as mentioned above. Although the zoom drive stop command and the zoom drive start command have been described as different commands, the zoom drive start command may be sent with a value indicating "stop" set as a parameter thereof. Alternatively, a zoom drive speed change command to set the driving speed to 0 may be used as the zoom drive stop command.

Display of Zoom Control GUI when Zoom Adapter 200 Cannot be Controlled

Figure 8E:

FIG. 8E shows an example of display in a disabled state in step S707 and the cause displayed in step S708 when the zoom adapter 200 cannot be controlled (in the case of NO in step S705 in FIG. 7A) in a state where the zoom adapter 200 is attached to the interchangeable lens 150.

In the example shown in FIG. 8E, an inoperable state (disabled state) is visually indicated by graying out the displayed zoom control GUI (in FIG. 8E, the constant-speed zoom control GUI 804a). Messages 881 and 882 indicating the causes of the uncontrollability that have been determined from the status information received in step S703 in FIG. 7A are displayed so as to overlap the constant-speed zoom control GUI 804a. In this example, the manual zoom mode being set in the zoom adapter 200 and a low remaining capacity of the battery of the zoom adapter 200 are displayed as the causes of the inability to control the zoom adapter 200.

As described above, according to this embodiment, the interchangeable lens is configured to relay communication between the digital camera to which the interchangeable lens is attached and the zoom adapter that is an external device for mechanically driving the zoom mechanism in the interchangeable lens from outside thereof. Therefore, as a result of the digital camera transmitting a command to control the zoom adapter received from a communicable electronic device to the interchangeable lens, indirect remote control of the zoom adapter from the electronic device, i.e. remote zoom control of the interchangeable lens is enabled.

Second Embodiment

Next, a second embodiment will be described. A remote capturing system according to the second embodiment has a configuration in which zoom control of an interchangeable lens that is performed by controlling a zoom adapter from a mobile phone (optical zoom control) and zoom control achieved as a result of a digital camera performing image processing (digital zoom control) are available. In this embodiment, functional configurations of the digital camera, the zoom adapter, and the mobile phone may be common to the first embodiment, and therefore, a description of the constituent elements will be omitted, and operation of each device will be described.

Note that, in this embodiment as well, processing performed by the camera 100 is achieved as a result of, in practice, the MPUs provided in the camera control unit 111 executing programs stored in the nonvolatile memory 112 and controlling other constituent elements as necessary. Similarly, processing performed by the interchangeable lens 150 is achieved as a result of the MPUs provided in the lens control unit 152 executing programs stored in the memory 153 and controlling other constituent elements as necessary. Processing performed by the zoom adapter 200 is achieved as a result of the MPUs provided in the adapter control unit 202 executing programs stored in the memory 203 and controlling other constituent elements as necessary. Furthermore, processing performed by the mobile phone 300 is achieved as a result of the MPUs provided in the control unit 301 executing programs (in particular, the camera communication application) stored in the nonvolatile memory 303 and controlling other constituent elements as necessary.

Note that digital zoom processing for a captured image is achieved as a result of the camera control unit 111 controlling an area for cropping the captured image performed by the image processing unit 106, and the magnification ratio in processing for zooming in or out. Since a specific technique for achieving digital zoom (also called electronic zoom) is known, a description of details thereof will be omitted. In this embodiment, the maximum magnification ratio and the minimum magnification ratio for digital zoom of the camera 100 are stored in advance in the nonvolatile memory 112. However, the maximum magnification ratio and the minimum magnification ratio may vary in accordance with settings of the camera 100, the angle of view of the interchangeable lens, and the like.

Application: Switching to/from Digital Zoom Control

In this embodiment, upon detecting an operation made to the zoom control GUI 804, the mobile phone 300 determines whether or not the zoom adapter is controllable, and whether or not digital zoom is controllable. Then, the mobile phone 300 transmits, to the camera 100, an appropriate one of a zoom control command addressed to the zoom adapter 200 and a digital zoom control command addressed to the camera 100. Specifically, if it is determined that the zoom adapter is controllable, the mobile phone 300 transmits the zoom control command, and if it is determined that the zoom adapter cannot be controlled, the mobile phone 300 transmits the digital zoom command. The mobile phone 300 (camera communication application) also displays digital zoom control-related items on the zoom control GUI during digital zooming. Details thereof will be described later.

Note that, in this embodiment, the camera communication application for achieving the remote capturing system on the mobile phone 300 provides only a constant-speed zoom control GUI as the zoom control GUI. For this reason, in this embodiment, in the remote capturing screen and the remote operation GUI provided by the camera communication application shown in FIG. 8A, a function of switching the zoom control GUI using the setting button 803 is not provided.

Figure 10A:
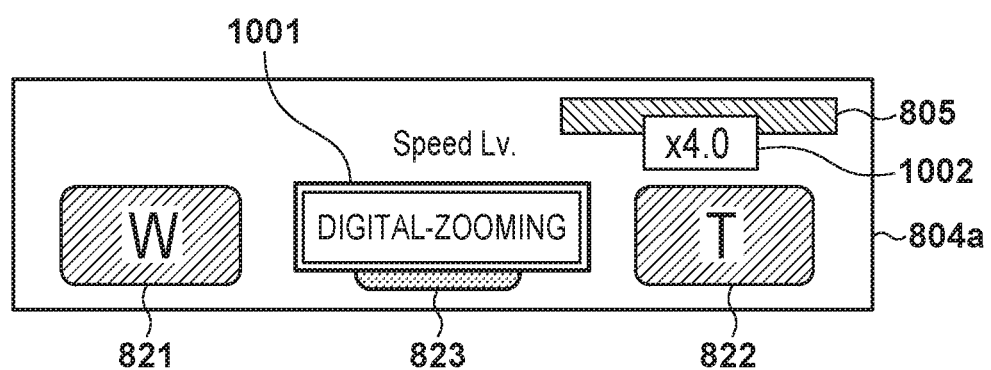
FIGS. 10A and 10B are diagrams showing exemplary GUIs provided by the application that operates on the mobile phone according to an embodiment.

If it is determined that the zoom adapter is controllable, the mobile phone 300 displays the constant-speed zoom control GUI 804a shown in FIG. 8B. On the other hand, if it is not determined that the zoom adapter is controllable, and it is determined that digital zoom is controllable, the mobile phone 300 displays digital zoom-related items on the constant-speed zoom control GUI 804a. FIG. 10A shows exemplary displayed digital zoom-related items.

In the example shown in FIG. 10A, a digital zoom warning 1001 and a digital zoom magnification ratio 1002 are displayed. As a result of the digital zoom warning 1001 being displayed, the user can comprehend that a zoom operation to be performed using the constant-speed zoom control GUI 804a is a digital zoom operation. In this embodiment, the digital zoom speed is fixed, and therefore, the mobile phone 300 displays the driving speed setting button 823 in a disabled state during digital zooming. Also, by displaying the digital zoom warning 1001 on the driving speed setting button 823, it can be readily comprehended that the driving speed setting button 823 is inoperable. The digital zoom magnification ratio 1002 indicates the current digital zoom magnification ratio.

In the following description, a state where information regarding digital zoom is displayed as shown in FIG. 10A will be called a digital zoom mode of the zoom control GUI. On the other hand, a state where information regarding digital zoom is not displayed as shown in FIG. 8B will be called a normal mode of the zoom control GUI.

Figure 10B:
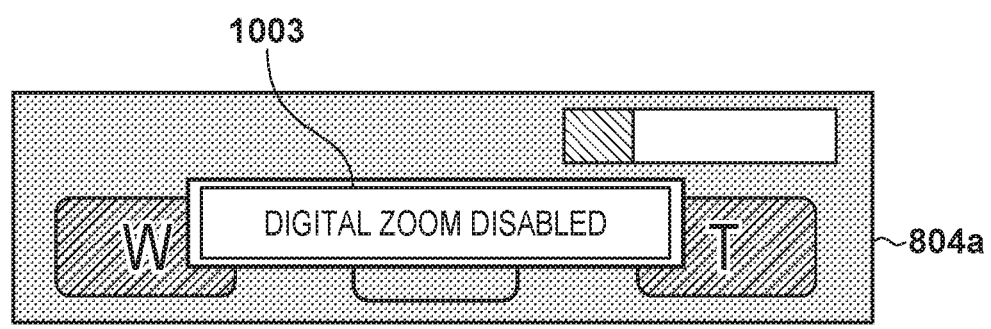

Note that if both the zoom adapter and digital zoom cannot be controlled, the mobile phone 300 displays the constant-speed zoom control GUI 804a in the digital zoom mode in a disabled state as shown in FIG. 10B to disable a zoom operation, for example. FIG. 10B shows an example in which a zoom operation disabled message 1003 is displayed as information regarding digital zoom.

A description will be given below of operation of the mobile phone 300 when executing zoom control of the interchangeable lens using the zoom adapter and digital zoom control performed in the digital camera while switching therebetween. Note that a description of processing common to the first embodiment will be omitted or simplified, and processing unique to this embodiment will be described intensively.

Operation of Digital Camera

Figures 1, 11A:
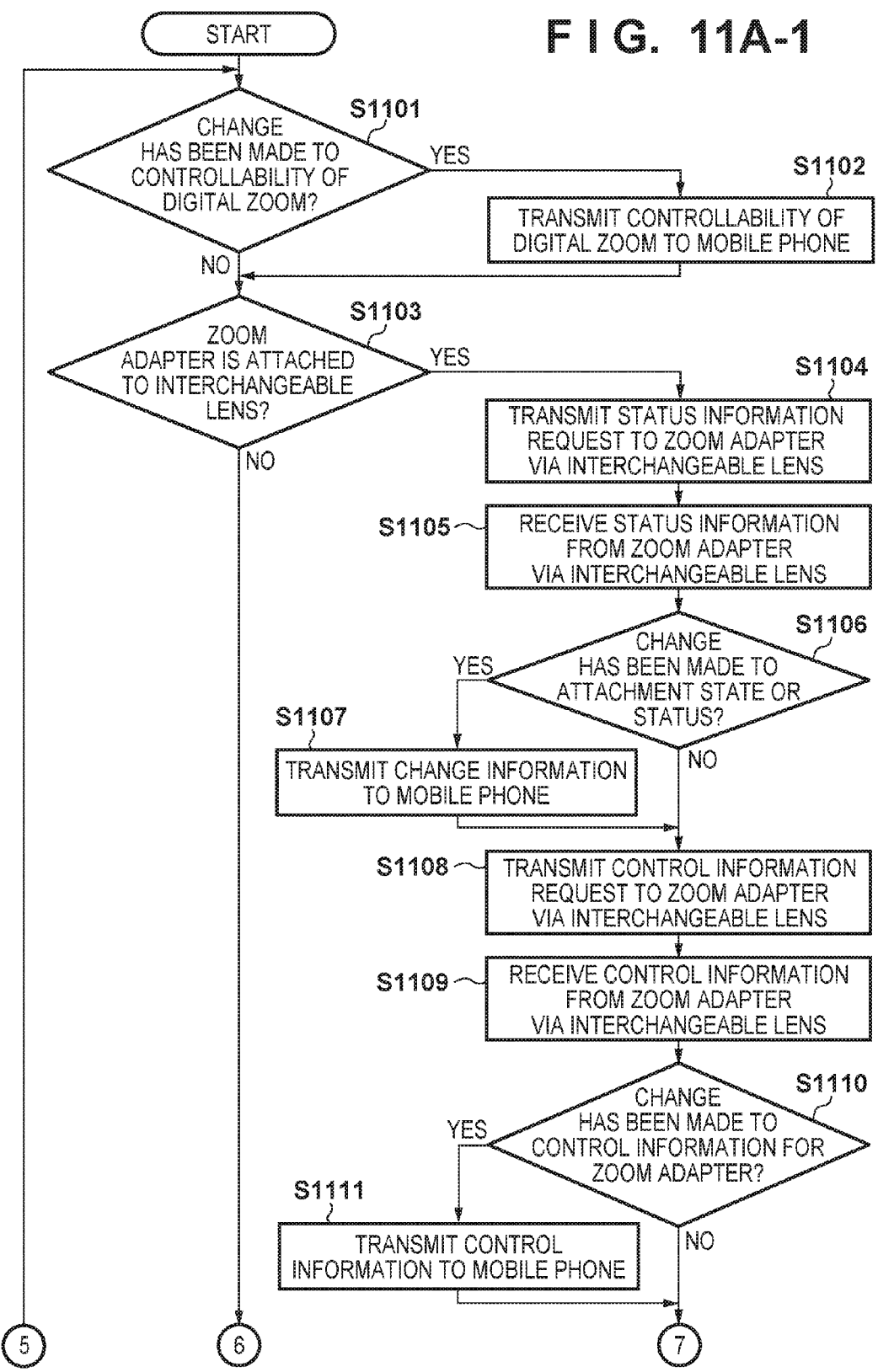
Figures 2, 11A:
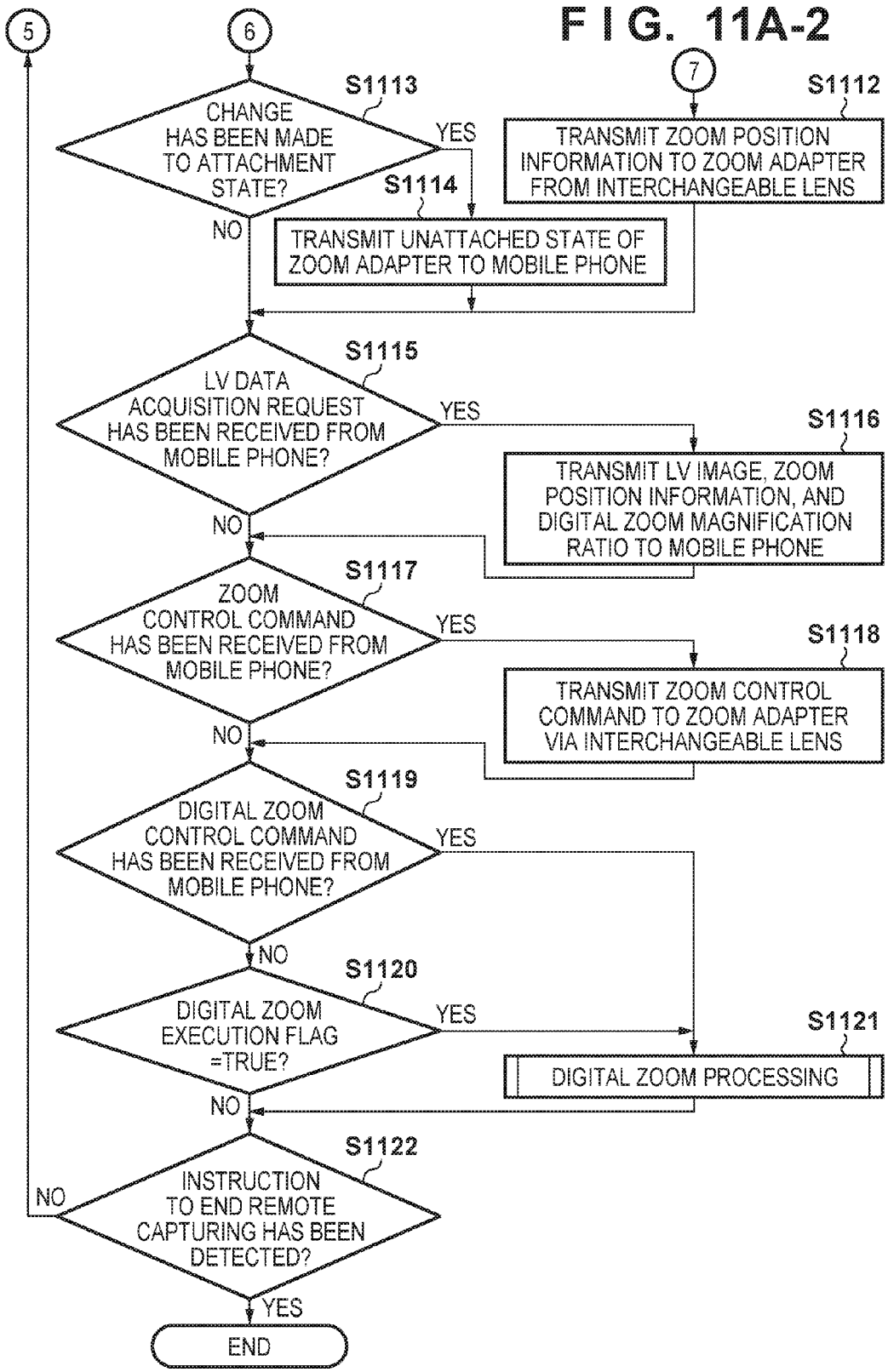

First, operation of the camera 100 will be described using flowchart in FIGS. 11A-1 and 11A-2. The operation shown in FIGS. 11A-1 and 11A-2 is started when a wireless connection between the mobile phone 300 and the camera 100 has been established, and an instruction to start a remote capturing operation has been given to the camera 100 from the camera communication application on the mobile phone 300, for example. Note that, during the remote capturing operation, the camera 100 regularly generates a live view image and reflects the digital zoom magnification ratio in the live view image during digital zooming.

In step S1101, the camera 100 determines whether or not a change has been made to the controllability of digital zoom, advances the processing to step S1102 if it is determined that a change has been made, and advances the processing to step S1103 if it is not determined that a change has been made. The controllability of digital zoom may be changed in accordance with settings of the camera 100, such as a capturing mode. Here, conditions under which digital zoom cannot be controlled are stored in advance, and the camera 100 performs this determination based on whether or not current settings match the conditions. Note that, at first determination, it is determined that a change has been made to advance the processing.

In step S1102, the camera 100 transmits, to the mobile phone 300, information indicating the changed controllability of digital zoom.

Processing in steps S1103 to S1115 is the same as the processing in steps S501 to S513 in FIG. 5A, and therefore, a description thereof will be omitted.

In step S1116, the camera 100 transmits, to the mobile phone 300, live view data including a live view image, zoom position information regarding the interchangeable lens 150, and digital zoom magnification ratio information. The digital zoom magnification ratio information includes a current magnification ratio, the maximum magnification ratio, and the minimum magnification ratio of digital zoom.

Note that the live view image, the zoom position information, and the digital zoom magnification ratio information may be transmitted at different timings. Configuration may be such that the maximum magnification ratio and the minimum magnification ratio included in the digital zoom magnification ratio information are not transmitted in this step, and are transmitted only when at least one of the maximum magnification ratio and the minimum magnification ratio has been changed.

Processing in steps S1117 and S1118 is the same as the processing in steps S515 and S516 in FIG. 5A, and therefore, a description thereof will be omitted.

In step S1119, the camera 100 determines whether or not a new digital zoom control command has been received from the mobile phone 300, advances the processing to step S1121 if it is determined that a new digital zoom control command has been received, and advances the processing to step S1120 if it is not determined that a new digital zoom control command has been received. The digital zoom control command received here is transmitted by the mobile phone 300 in later-described step S1222 in FIG. 12A-2. Note that if digital zoom cannot be controlled, the camera 100 advances the processing to step S1120. Note that, in this embodiment, one of a digital zoom start command and a digital zoom stop command is transmitted as the digital zoom control command. The digital zoom start command includes designation of a zoom direction (telephoto-side or wide-angle side).

In step S1120, the camera 100 checks a digital zoom execution flag, which indicates whether or not digital zoom processing is ongoing, advances the processing to step S1121 if the flag indicates TRUE, and advances the processing to step S1122 if the flag indicates FALSE.

In step S1121, the camera 100 executes digital zoom processing. Details of the digital zoom processing will be described later using FIG. 11B.

In step S1122, similar to step S517, the camera 100 determines whether or not an instruction to end remote capturing has been given, ends the processing shown in FIGS. 11A-1 and 11A-2 if it is determined that the instruction to end remote capturing has been given, and returns the processing to step S1101 if it is not determined that the instruction to end remote capturing has been given.

Digital Zoom Processing

Next, details of the digital zoom processing performed in step S1121 by the camera 100 will be described using a flowchart in FIG. 11B.

In step S1151, the camera 100 determines whether or not a digital zoom control command has been received from the mobile phone 300, advances the processing to step S1152 if it is determined that a digital zoom control command has been received, and advances the processing to step S1156 if it is not determined that a digital zoom control command has been received.

In step S1152, the camera 100 advances the processing to step S1153 if the digital zoom control command received from the mobile phone 300 is a digital zoom start command, and advances the processing to step S1155 if the received digital zoom control command is the digital zoom end command.

In step S1153, the camera 100 sets the digital zoom execution flag saved in the system memory 113, for example, to TRUE.

In step S1154, the camera 100 saves information regarding the zoom direction included in the digital zoom start command, in the system memory 113, for example.

In step S1155, the camera 100 sets the digital zoom execution flag to FALSE.

In step S1156, the camera 100 checks the value of the digital zoom execution flag, advances the processing to step S1157 if the value is TRUE, and ends the digital zoom processing shown in FIG. 11B if the value is FALSE.

In step S1157, the camera 100 advances the processing to step S1158 if the saved zoom direction is the telephoto-side, and advances the processing to step S1161 if the saved zoom direction is the wide-angle side.

In step S1158, the camera 100 determines whether or not the current digital zoom magnification ratio is the maximum magnification ratio, advances the processing to step S1159 if it is determined that the current digital zoom magnification ratio is the maximum magnification ratio, and advances the processing to step S1160 if it is not determined that the current digital zoom magnification ratio is the maximum magnification ratio.

In step S1159, the camera 100 cannot further zoom in to the telephoto-side, and therefore sets the digital zoom execution flag to FALSE.

On the other hand, in step S1160, the camera 100 increases the digital zoom magnification ratio by a predetermined unit magnification ratio, and ends the digital zoom processing.

On the other hand, if the saved zoom direction is wide-angle side, in step S1161, the camera 100 determines whether or not the current digital zoom magnification ratio is the minimum magnification ratio, advances the processing to step S1162 if it is determined that the current digital zoom magnification ratio is the minimum magnification ratio, and advances the processing to step S1163 if it is not determined that the current digital zoom magnification ratio is the minimum magnification ratio.

In step S1162, the camera 100 cannot further zoom out to the wide-angle side, and therefore sets the digital zoom execution flag to FALSE.

On the other hand, in step S1163, the camera 100 decreases the digital zoom magnification ratio by a predetermined unit magnification ratio, and ends the digital zoom processing.

Operation of Mobile Phone

Figures 1, 12A:
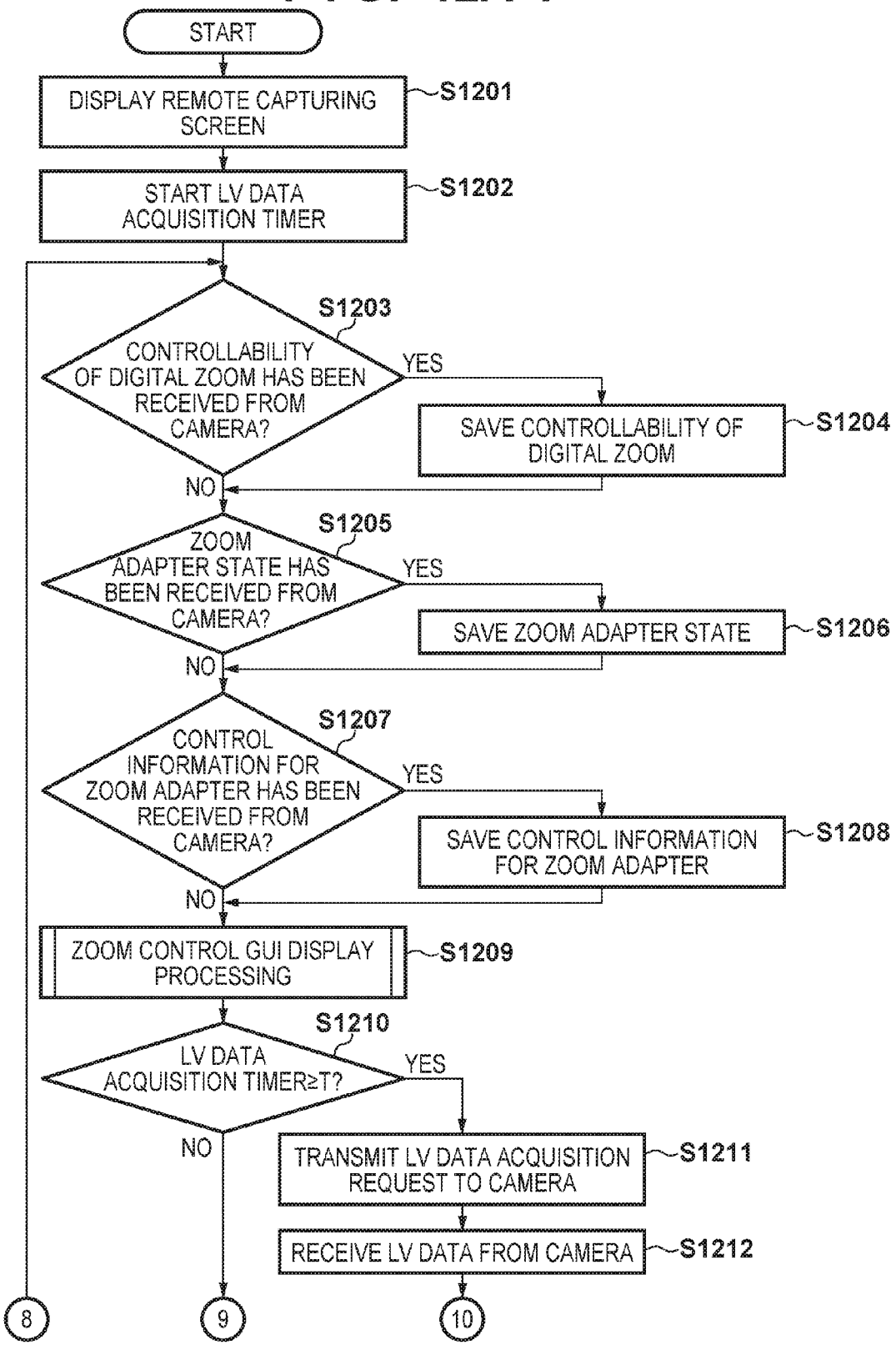

Next, operation of the mobile phone 300 will be described using flowcharts in FIGS. 12A-1 and 12A-2. The operation shown in FIGS. 12A-1 and 12A-2 is started when a wireless connection between the mobile phone 300 and the camera 100 has been established, and an instruction to start a remote capturing operation has been given to the camera 100 from the camera communication application on the mobile phone 300, for example.

Since processing in steps S1201 and S1202 is the same as the processing in steps S701 and S702 in FIG. 7A, a description thereof will be omitted.

In step S1203, the mobile phone 300 determines whether or not information regarding controllability of digital zoom has been received from the camera 100, advances the processing to step S1204 if it is determined that the information has been received, and advances the processing to step S1205 if it is not determined that the information has been received. The information regarding controllability of digital zoom received here is transmitted by the camera 100 in step S1102 in FIG. 11A-1.

In step S1204, the mobile phone 300 saves the received information regarding the controllability of digital zoom in the work memory 304, for example.

In step S1205, similar to step S703, the mobile phone 300 determines whether or not information regarding a state of the zoom adapter 200 has been received from the camera 100, advances the processing to step S1206 if it is determined that the information has been received, and advances the processing to step S1207 if it is not determined that the information has been received. An attachment state or status information regarding the zoom adapter 200 received here is transmitted from the camera 100 in step S1107 or S1114 in FIG. 11A-2.

In step S1206, the mobile phone 300 saves the received information regarding a state of the zoom adapter 200 in the work memory 304, for example.

In step S1207, similar to step S709, the mobile phone 300 determines whether or not control information regarding the zoom adapter 200 has been received from the camera 100, advances the processing to step S1208 if it is determined that the information has been received, and advances the processing to step S1209 if it is not determined that the information has been received. The control information received here is transmitted from the camera 100 in step S1111 in FIG. 11A-1.

In step S1208, the mobile phone 300 saves the received control information regarding the zoom adapter 200 in the work memory 304, for example.

In step S1209, the mobile phone 300 displays the zoom control GUI based on the saved information regarding a state of the zoom adapter 200 and the information regarding the controllability of digital zoom. Details of this processing will be described later using FIG. 12B.

Processing in steps S1210 and S1211 is the same as the processing in steps S712 and S713 in FIG. 7B, and therefore, a description thereof will be omitted.

In step S1212, the mobile phone 300 receives, from the camera 100, live view data including a live view image, zoom position information, and digital zoom magnification ratio information. The live view data received here is transmitted from the camera 100 in step S1116 in FIG. 11A-2.

Processing in steps S1213 to S1215 is the same as the processing in steps S715 to S717 in FIG. 7B, and therefore, a description thereof will be omitted.

In step S1216, the mobile phone 300 determines whether or not the currently-displayed constant-speed zoom control GUI 804a is in the digital zoom mode, advances the processing to step S1217 if it is determined that the currently-displayed zoom control GUI 804a is in the digital zoom mode, and advances the processing to step S1218 if it is not determined that the currently-displayed zoom control GUI 804a is in the digital zoom mode.

In step S1217, the mobile phone 300 updates digital zoom magnification ratio 1002 displayed on the zoom control GUI 804a.

Processing in step S1218 is the same as the processing in step S718 in FIG. 7B, and therefore, a description thereof will be omitted.

In step S1219, similar to step S719, the mobile phone 300 determines whether or not a zoom control operation has been detected, advances the processing to step S1220 if it is determined that a zoom control operation has been detected, and advances the processing to step S1223 if it is not determined that a zoom control operation has been detected. Here, if both the zoom adapter 200 and digital zoom cannot be controlled, the zoom control GUI 804a is displayed in an inoperable state (i.e. disabled state), and therefore, it is not determined in step S1219 that a zoom control operation has been detected.

In step S1220, the mobile phone 300 performs command determination processing for determining a command that is to be transmitted to the camera 100, in accordance with the detected zoom control operation (details thereof will be described later using FIG. 12C). In the command determination processing, the mobile phone 300 determines appropriate one of a zoom control command addressed to the zoom adapter 200 and a digital zoom command addressed to the digital camera. In the command determination processing, the mobile phone 300 also determines whether or not a zoom control command needs to be transmitted.

In step S1221, the mobile phone 300 advances the processing to step S1222 if it is determined, as a result of the command determination processing in step S1220, that the zoom control command associated with the zoom control operation detected in step S1219 is a command that needs to be transmitted, and advances the processing to step S1223 if it is not determined that the zoom control command is a command that needs to be transmitted.

In step S1222, the mobile phone 300 transmits, to the camera 100, the zoom control command or the digital zoom control command regarding which the determination is performed in step S1220.

In step S1223, similar to step S723, the mobile phone 300 determines whether or not an instruction to end remote capturing has been given, ends the processing shown in FIGS. 12A-1 and 12A-2 if it is determined that the instruction to end remote capturing has been given, and returns the processing to step S1203 if it is not determined that the instruction to end remote capturing has been given.

Next, zoom control GUI display processing performed in step S1209 by the mobile phone 300 will be described using a flowchart in FIG. 12B. The mobile phone 300 selects a zoom control GUI display mode based on the status information regarding the zoom adapter and the controllability of digital zoom, and displays the zoom control GUI on the display unit 306.

In step S1231, the mobile phone 300 references the attachment state and the status information regarding the zoom adapter that are saved in the work memory 304, and determines whether or not the zoom adapter 200 is in a controllable state. If it is determined that the zoom adapter 200 is in a controllable state, the mobile phone 300 advances the processing to step S1232, and if it is not determined that the zoom adapter 200 is in a controllable state, the mobile phone 300 advances the processing to step S1235.

In step S1232, the mobile phone 300 determines whether or not the zoom control GUI 804a is currently in the digital zoom mode, advances the processing to step S1233 if it is determined that the zoom control GUI 804a is in the digital zoom mode, and advances the processing to step S1234 if it is not determined that the zoom control GUI 804a is in the digital zoom mode.

In step S1233, the mobile phone 300 references the information regarding the controllability of digital zoom saved in the work memory 304, ends the processing shown in FIG. 12B and maintains the zoom control GUI 804a in the digital zoom mode if digital zoom is controllable.

If digital zoom cannot be controlled, the mobile phone 300 advances the processing to step S1234, changes the mode of the zoom control GUI 804a to the normal mode, and ends the processing shown in FIG. 12B.

On the other hand, in step S1235, similar to step S1233, the mobile phone 300 advances the processing to step S1236 if digital zoom is controllable, and advances the processing to step S1237 if digital zoom cannot be controlled.

In step S1236, the mobile phone 300 sets the mode of the zoom control GUI 804a to the digital zoom mode, and ends the processing shown in FIG. 12B.

In step S1237, the mobile phone 300 sets the mode of the zoom control GUI 804a to the digital zoom mode and disables operation thereto (i.e. displays the zoom control GUI 804a in a disabled state), and then ends the processing shown in FIG. 12B.

Figure 12C:
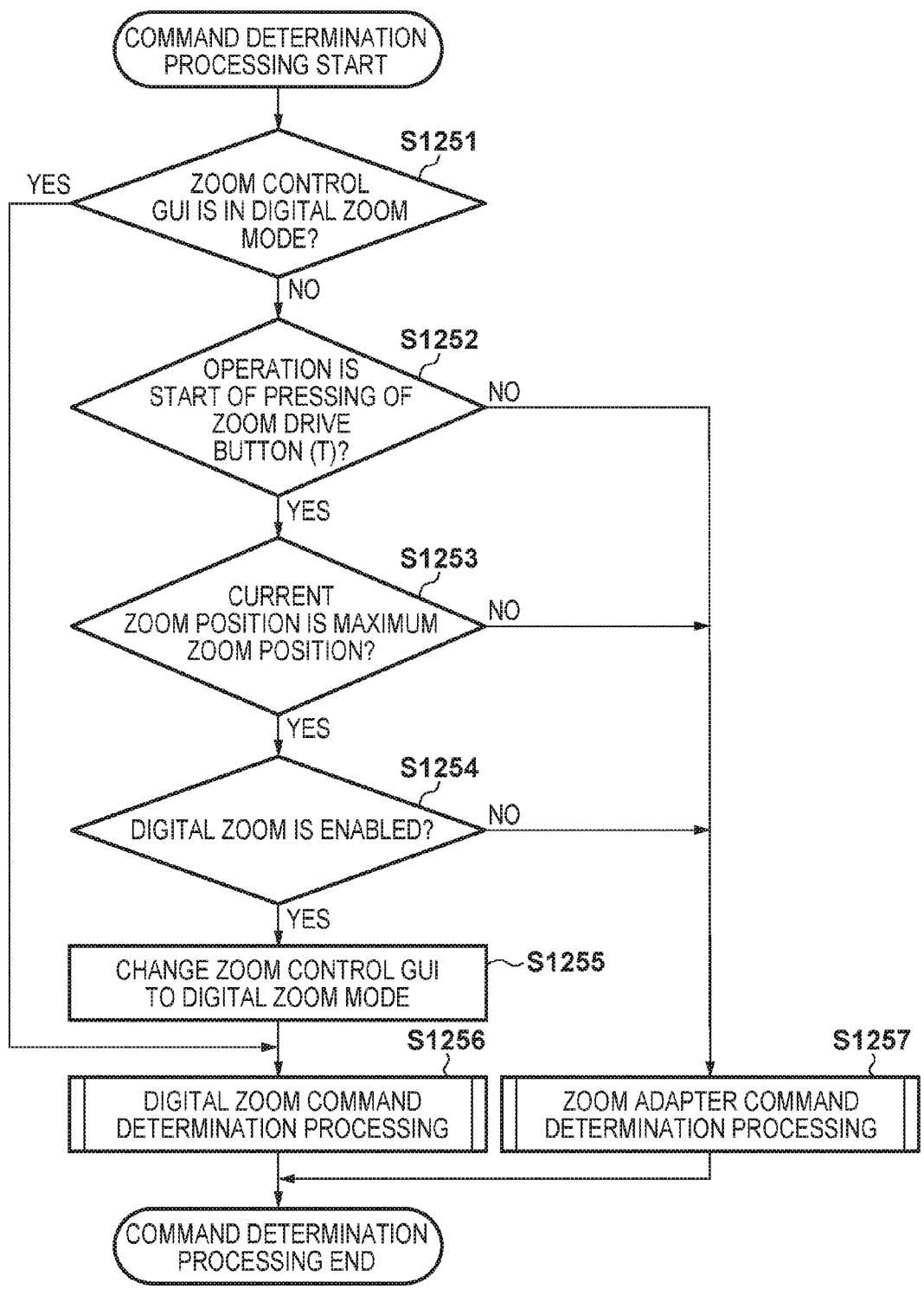
FIG. 12C is a flowchart related to an operation of the digital camera according to an embodiment.

FIG. 12C is a flowchart related to the command determination processing performed in step S1220 when the mobile phone 300 determines in step S1219 in FIG. 12A-2 that an operation made to the zoom control GUI 804a has been detected. In the command determination processing in this embodiment, the mobile phone 300 determines a command that is to be transmitted to the camera 100, in accordance with the mode of the currently-displayed zoom control GUI 804a. The mobile phone 300 determines in step S1221 in FIG. 12A-2 whether or not a command needs to be transmitted, based on the command that is set at the end of the command determination processing.

In the command determination processing, the mobile phone 300 determines a digital zoom control command as the command that is to be transmitted to the camera 100 if the constant-speed zoom control GUI 804a is in the digital zoom mode, and determines a zoom control command addressed to the zoom adapter 200 thereas if the constant-speed zoom control GUI 804a is in the normal mode. However, if an instruction to zoom in to the telephoto-side is given in a state where the zoom position of the interchangeable lens 150 is the telephoto end, the mobile phone 300 changes the mode of the constant-speed zoom control GUI 804a to the digital zoom mode, and transmits a digital zoom control command. The flowchart will be described below.

In step S1251, the mobile phone 300 determines whether or not the currently-displayed zoom control GUI 804a is in the digital zoom mode, advances the processing to step S1256 if it is determined that the zoom control GUI 804a is in the digital zoom mode, and advances the processing to step S1252 if it is not determined that the zoom control GUI 804a is in the digital zoom mode.

In step S1252, the mobile phone 300 determines whether or not the operation detected in step S1219 is a start of the pressing of the zoom drive button (T) 822. The mobile phone 300 advances the processing to step S1253 if it is determined that the detected operation is a start of the pressing of the zoom drive button (T) 822, and advances the processing to step S1257 if it is not determined that the detected operation is a start of the pressing of the zoom drive button (T) 822.

In step S1253, the mobile phone 300 references the zoom position information saved in the work memory 304 to determine whether or not the current zoom position is the maximum zoom position, advances the processing to step S1254 if it is determined that the current zoom position is the maximum zoom position, and advances the processing to step S1257 if it is not determined that the current zoom position is the maximum zoom position.

In step S1254, the mobile phone 300 references the information regarding the controllability of digital zoom saved in the work memory 304, and branches the processing depending on whether or not digital zoom is controllable. The mobile phone 300 advances the processing to step S1255 if digital zoom is controllable, and advances the processing to step S1257 if digital zoom cannot be controlled. However, if digital zoom cannot be controlled, "transmission unnecessary" is set as a command in adapter command determination processing in step S1257 (details thereof will be described later using FIG. 12D).

In step S1255, the mobile phone 300 changes the mode of the zoom control GUI 804a to the digital zoom mode.

In step S1256, the mobile phone 300 performs digital zoom command determination processing for determining a digital zoom control command that is to be transmitted to the camera 100 (details thereof will be described later using FIG. 12D), and ends the processing shown in FIG. 12C.

On the other hand, in step S1257, the mobile phone 300 performs adapter command determination processing for determining a zoom control command addressed to the zoom adapter 200 to be transmitted to the camera 100, and ends the processing shown in FIG. 12C. Here, the adapter command determination processing is the same as the command determination processing described using FIGS. 9A-1 and 9A-2 in the first embodiment, and therefore, a description thereof will be omitted.

Thus, in the command determination processing in this embodiment, it is determined whether or not to perform optical zoom or digital zoom, thereafter command determination processing corresponding to the zoom type is executed, and a command that is to be transmitted to the camera 100 is determined.

Next, details of the digital zoom command determination processing performed by the mobile phone 300 in step S1256 in FIG. 12C will be described using a flowchart shown in FIG. 12D.

The digital zoom command determination processing is executed if it is determined in step S1219 that one of a start and a stop of the pressing of the zoom drive button (W) 821, or one of a start and a stop of the pressing of the zoom drive button (T) 822 has been detected.

In step S1271, the mobile phone 300 sets "transmission unnecessary" as an initial value of the command that is to be transmitted to the camera 100.

In step S1272, the mobile phone 300 advances the processing to step S1273 if it is determined that the detected operation is a start of the pressing, and advances the processing to step S1280 if it is determined that the detected operation is an end of the pressing.

In step S1273, the mobile phone 300 determines whether the detected operation has been made to the zoom drive button (W) 821 or the zoom drive button (T) 822, advances the processing to step S1274 if it is determined that the detected operation has been made to the zoom drive button (T), and advances the processing to step S1276 if the detected operation has been made to the zoom drive button (W).

Figure 12D:
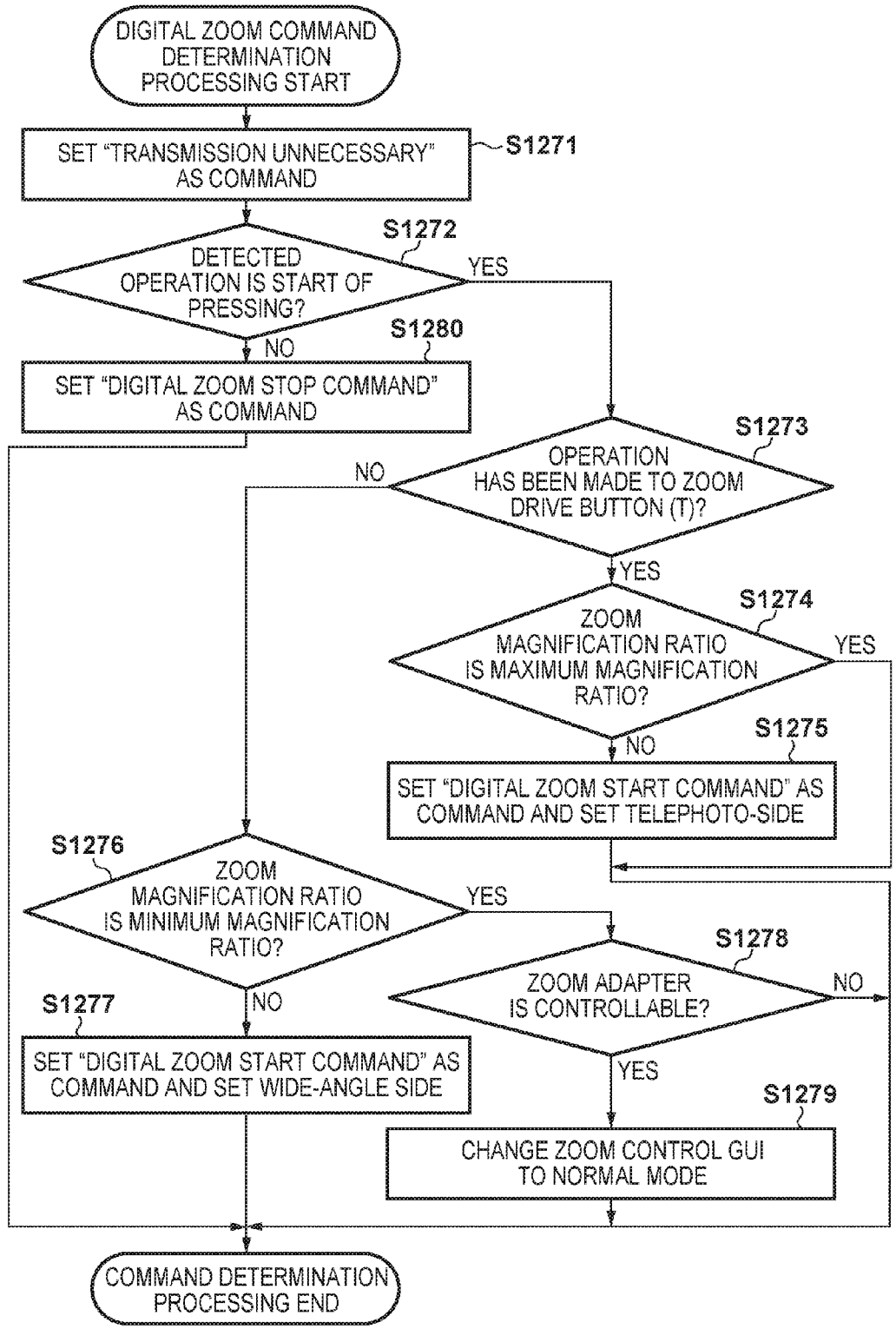
FIG. 12D is a flowchart related to an operation of the digital camera according to an embodiment.

In step S1274, the mobile phone 300 determines whether or not the current digital zoom magnification ratio is the maximum magnification ratio, and ends the processing shown in FIG. 12D if it is determined that the current digital zoom magnification ratio is the maximum magnification ratio, since the magnification ratio cannot be further increased. If it is not determined that the current digital zoom magnification ratio is the maximum magnification ratio, the mobile phone 300 advances the processing to step S1275.

In step S1275, the mobile phone 300 sets a digital zoom start command as the command that is to be transmitted to the digital camera, sets the telephoto-side as a zoom direction parameter of the digital zoom start command, and ends the processing shown in FIG. 12D.

On the other hand, in step S1276, the mobile phone 300 determines whether or not the current digital zoom magnification ratio is the minimum magnification ratio, and advances the processing to step S1278 if it is determined that the current digital zoom magnification ratio is the minimum magnification ratio, since the magnification ratio cannot be further decreased. If it is not determined that the current digital zoom magnification ratio is the minimum magnification ratio, the mobile phone 300 advances the processing to step S1277.

In step S1277, the mobile phone 300 sets the digital zoom start command as the command that is to be transmitted to the digital camera, sets the wide-angle side as a zoom direction parameter of the digital zoom start command, and ends the processing shown in FIG. 12D.

In step S1278, the mobile phone 300 references the attachment state and the status information regarding the zoom adapter 200 saved in the work memory 304, and determines whether or not the zoom adapter 200 is in a controllable state. The mobile phone 300 advances the processing to step S1279 if it is determined that the zoom adapter 200 is in a controllable state, and ends the processing shown in FIG. 12D if it is not determined that the zoom adapter 200 is in a controllable state.

In step S1279, the mobile phone 300 changes the mode of the zoom control GUI from the digital zoom mode to the normal mode, and ends the processing shown in FIG. 12D. Thus, the user can control the zoom adapter 200 to cause the interchangeable lens 150 to change the zoom position.

In step S1272, if it is not determined that the detected operation is a start of the pressing, the operation is an end of the pressing, and therefore, in step S1280, the mobile phone 300 sets a digital zoom stop command as the command that is to be transmitted to the camera 100, and ends the processing shown in FIG. 12D.

This embodiment can not only achieve the effects of the first embodiment, but also achieve remote capturing using zoom if digital zoom of a camera is available even in the case where a zoom adapter cannot be controlled, and can improve user convenience. Also, an electronic device that controls remote capturing transmits, to a camera, an appropriate zoom control command based on a controllability state of a zoom adapter and a controllability state of digital zoom, and therefore, the user can perform remote zoom control with common operations. Furthermore, due to a configuration in which, if an instruction to zoom in to the telephoto-side in a state where optical zoom is performed at the maximum magnification ratio, the zoom instruction is automatically switched to a digital zoom control command, and therefore, a convenient zoom operation at a high magnification ratio using both optical zoom and digital zoom can be provided.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-254865, filed on Dec. 25, 2015, which is hereby incorporated by reference herein in its entirety.

What is claimed is:

1. An electronic device comprising:
   a communication unit configured to communicate with an image capture apparatus;
   an operation unit; and
   a control unit configured to, in accordance with an operation made to the operation unit, generate a zoom control command to change an angle of view of a lens unit attached to the image capture apparatus, and transmit the zoom control command to the image capture apparatus through the communication unit, wherein:

the zoom control command is a command to control an operation of a driver device configured to mechanically drive, from outside the lens unit, a zoom mechanism provided in the lens unit;

the operation unit includes a display device; and the control unit determines whether the driver device is attached or not based on information obtained from the image capture apparatus through the communication unit, and if it is determined that the driver device is attached, displays a graphical user interface (GUI) for the operation of the driver device.

2. The electronic device according to claim 1,
wherein the zoom control command is one of a zoom drive speed change command, a zoom drive start command, and a zoom drive stop command.

3. The electronic device according to claim 2,
wherein the control unit generates the zoom drive start command and the zoom drive stop command in accordance with an operation made to a first operation unit included in the operation unit, and generates the zoom drive speed change command in accordance with an operation made to a second operation unit included in the operation unit.

4. The electronic device according to claim 2,
wherein the control unit generates the zoom drive speed change command and the zoom drive start command in accordance with a direction and an amount of an operation made to the operation unit.

5. The electronic device according to claim 1,
wherein, upon receiving, from the image capture apparatus, information indicating that the driver device cannot be controlled, the control unit makes the operation unit inoperable.

6. The electronic device according to claim 1,
wherein if the driver device cannot be controlled, and control processing for a zoom function executed by the image capture apparatus is enabled, the control unit generates a command to control the zoom function of the image capture apparatus in accordance with an operation made to the operation unit, and transmits the command to the image capture apparatus.

7. The electronic device according to claim 1,
wherein if it is detected that an operation of instructing the operation unit to zoom in to a telephoto-side has been made in a state where a current zoom position of the lens unit is a maximum zoom position and processing for controlling a zoom function executed by the image capture apparatus is enabled, the control unit generates a control command to increase a magnification ratio of the zoom function of the image capture apparatus and transmits the control command to the image capture apparatus.

8. An image capture apparatus that communicates with the electronic device according to claim 1, comprising:

a communication unit configured to communicate with an external device, wherein the external device is the electronic device; and a control unit configured to control communications with a detachably attached lens unit and with the external device, wherein the control unit transmits a control command for a driver device received from the external device through the communication unit to the driver device via the lens unit, the driver device mechanically driving, from outside the lens unit, a zoom mechanism in the lens unit attached to the image capture apparatus.

9. The image capture apparatus according to claim 8,
wherein the control unit transmits information regarding a zoom position of the lens unit and information regarding the driver device that are received from the lens unit, to the external device through the communication unit.

10. The image capture apparatus according to claim 9,
wherein the information regarding the zoom position includes a current zoom position, a maximum zoom position, and a minimum zoom position.

11. The image capture apparatus according to claim 9,
wherein the information regarding the driver device includes status information regarding a current state of the driver device, and control information regarding a capability of the driver device and content that is settable from outside the driver device.

12. The image capture apparatus according to claim 8,
wherein when communication with the external device has been established, the control unit transmits an image captured by the image capture apparatus to the external device through the communication unit.

13. The image capture apparatus according to claim 8,
wherein if the control unit has received a control command regarding digital zoom from the external device, the control unit performs digital zoom processing at a magnification ratio according to the control command regarding digital zoom on an image to be transmitted to the external device, and thereafter transmits the image to the external device.

14. A method for controlling the image capture apparatus according to claim 8, the method comprising:

receiving, from the external device, a control command for a driver device that mechanically drives a zoom mechanism in a lens unit attached to the image capture apparatus, from outside the lens unit; and transmitting the control command to the driver device via the lens unit.

15. A lens unit capable of being attached to and detached from an image capture apparatus that communicates with the electronic device according to claim 1, comprising:

a zoom mechanism that can be manually operated;

a first communication unit configured to communicate with the image capture apparatus;

a second communication unit configured to communicate with a driver device that mechanically drives the zoom mechanism from outside the lens unit; and a control unit configured to control communication with the image capture apparatus and the driver device, wherein the control unit transmits a control command for the driver device received from the image capture apparatus through the first communication unit, to the driver device through the second communication unit.

16. The lens unit according to claim 15,
wherein, upon receiving, through the second communication unit, data transmitted from the driver device to the image capture apparatus, the control unit transmits the data to the image capture apparatus through the first communication unit.

17. The lens unit according to claim 15,
wherein the control unit transmits information regarding a zoom position to the driver device in accordance with a command from the image capture apparatus.

18. A driver device that drives the lens unit according to claim 15, comprising:

a driver unit configured to mechanically drive an operation member in a zoom mechanism provided in a lens unit;

a lens communication unit configured to communicate with the lens unit; and a control unit configured to control an operation of the driver unit in accordance with a control command received through the lens communication unit.

19. The driver device according to claim 18, further comprising:

a switching unit configured to switch between enabling and disabling the operation of the driver unit.

20. A method for controlling the lens unit according to claim 15, the method comprising:

receiving, from an image capture apparatus to which the lens unit is attached, a control command for a driver device that mechanically drives the zoom mechanism from outside the lens unit; and transmitting the control command for the driver device to the driver device.

21. A method for controlling the driver device according to claim 18, the method comprising:

receiving a control command for the driver unit from the lens unit; and controlling an operation of the driver unit in accordance with the control command.

22. A method for controlling an electronic device having a function of communicating with an image capture apparatus, the method comprising:

detecting an operation made to an operation unit in the electronic device, wherein the operation unit includes a display unit;

generating a zoom control command to change an angle of view of a lens unit attached to the image capture apparatus, in accordance with the detected operation;

transmitting the zoom control command to the image capture apparatus, wherein the zoom control command is a command to control an operation of a driver device that mechanically drives, from outside the lens unit, a zoom mechanism provided in the lens unit;

determining whether the driver device is attached or not based on information obtained from the image capture apparatus; and displaying a graphical user interface (GUI) for the operation of the driver device if it is determined that the driver device is attached.

* * * * *